(12) United States Patent
Dessard et al.

(10) Patent No.: US 12,212,440 B2
(45) Date of Patent: Jan. 28, 2025

(54) SYSTEMS AND METHODS FOR SIGNAL ISOLATION IN POWER CONVERTERS

(71) Applicant: Navitas Semiconductor Limited, Dublin (IE)

(72) Inventors: Vincent Dessard, Mont-saint-Guibert (BE); Aimad Saib, Gembloux (BE)

(73) Assignee: Navitas Semiconductor Limited, Dublin (IE)

( * ) Notice: Subject to any disclaimer, the term of this patent is extended or adjusted under 35 U.S.C. 154(b) by 0 days.

(21) Appl. No.: 18/408,464

(22) Filed: Jan. 9, 2024

(65) Prior Publication Data

US 2024/0235384 A1 Jul. 11, 2024

Related U.S. Application Data

(60) Provisional application No. 63/479,321, filed on Jan. 10, 2023.

(51) Int. Cl.
*H04L 25/02* (2006.01)

(52) U.S. Cl.
CPC ................. *H04L 25/0266* (2013.01)

(58) Field of Classification Search
CPC .................................................. H04L 25/0266
USPC ........................................................ 375/257
See application file for complete search history.

(56) References Cited

U.S. PATENT DOCUMENTS

| 6,144,326 A | 11/2000 | Krone |
| 2009/0027243 A1 | 1/2009 | Leung |
| 2012/0161841 A1 | 6/2012 | Dong |
| 2013/0088092 A1 | 4/2013 | Ladron De Guevara |
| 2013/0257527 A1* | 10/2013 | Dong ...................... H01L 24/49 |
| | | 257/532 |
| 2016/0126724 A1* | 5/2016 | Yun ..................... H04L 25/0276 |
| | | 361/111 |
| 2017/0155391 A1 | 6/2017 | Kinzer |
| 2018/0062678 A1 | 3/2018 | Ragonese |
| 2018/0262297 A1* | 9/2018 | Milesi ................... H04L 1/0036 |
| 2020/0099551 A1 | 3/2020 | Liu |
| 2021/0083907 A1* | 3/2021 | Briano ................... H04B 17/17 |

OTHER PUBLICATIONS

Extended European Search Report for EP application No. 23179008.0, issued Dec. 6, 2023, 6 pages.
Int'l Search Report and Written Opinion for related application, PCT/US2024/010947, issued Apr. 16, 2024, 10 pages.

* cited by examiner

*Primary Examiner* — Don N Vo
(74) *Attorney, Agent, or Firm* — FisherBroyles, LLP

(57) ABSTRACT

A circuit is disclosed. The circuit includes a transmitter having an input terminal arranged to receive input data and a transmission node arranged to transmit intermediate data corresponding to the input data, and a receiver having a receive node arranged to receive the intermediate data and an output terminal arranged to produce output data corresponding to the input data, the receiver further including a dV/dt detector circuit coupled to the receive node and arranged to stop the production of the output data at the output terminal when the dV/dt detector circuit detects a rate of change of voltage with respect to time greater than a predetermined threshold.

20 Claims, 12 Drawing Sheets

SYSTEMS AND METHODS FOR SIGNAL ISOLATION IN POWER CONVERTERS

CROSS REFERENCE TO RELATED APPLICATIONS

This application claims priority to U.S. provisional patent application Ser. No. 63/479,321, for "Systems and Methods for Signal Isolation in Power Converters" filed on Jan. 10, 2023, which is hereby incorporated by reference in entirety for all purposes.

FIELD

The described embodiments relate generally to galvanic isolation in power converters, and more particularly, the present embodiments relate to systems and methods for signal isolation in power converters.

BACKGROUND

Electronic devices such as computers, servers and televisions, among others, employ one or more electrical power conversion circuits to convert one form of electrical energy to another. Some electrical power conversion circuits convert a high DC voltage to a lower DC voltage using a circuit topology called a half bridge converter. As many electronic devices are sensitive to size and efficiency of the power conversion circuit, new power converters can provide relatively higher efficiency and lower size for the new electronic devices.

SUMMARY

In some embodiments, a circuit is disclosed. The circuit includes a transmitter having an input terminal arranged to receive input data and a transmission node arranged to transmit intermediate data corresponding to the input data; and a receiver having a receive node arranged to receive the intermediate data and an output terminal arranged to produce output data corresponding to the input data, the receiver further including a dV/dt detector circuit coupled to the receive node and arranged to stop the production of the output data at the output terminal when the dV/dt detector circuit detects a rate of change of voltage with respect to time greater than a predetermined threshold.

In some embodiments, the dV/dt detector circuit is a first dV/dt detector circuit and the predetermined threshold is a first predetermined threshold, where the transmitter further includes a second dV/dt detector circuit coupled to the transmission node and arranged to cause the transmitter to send a refresh signal to the receiver when the second dV/dt detector circuit detects a rate of change of voltage that is less than a second predetermined threshold.

In some embodiments, the first predetermined threshold is greater than the second predetermined threshold.

In some embodiments, the transmitter is disposed on a first die and the receiver is disposed on a second die.

In some embodiments, the first and second dies are disposed in a common electronic package.

In some embodiments, the circuit further includes a signal isolator coupled between the transmitter and the receiver.

In some embodiments, the signal isolator includes plurality of cross-coupled capacitors.

In some embodiments, the plurality of cross-coupled capacitors includes high voltage common centroidal layout capacitors.

In some embodiments, the signal isolator includes a plurality of capacitors arranged in a non-cross-coupled configuration.

In some embodiments, the signal isolator includes one or more mismatch compensation capacitors.

In some embodiments, the plurality of cross-coupled capacitors are formed from conductive semiconductor layers.

In some embodiments, the receiver further includes a low input impedance circuit that is coupled to the signal isolator.

In some embodiments, a method of operating a circuit is disclosed. The method includes providing a transmitter having an input terminal arranged to receive input data and a transmission node arranged to transmit intermediate data corresponding to the input data; providing a receiver having a receive node arranged to receive the intermediate data and an output terminal arranged to produce output data corresponding to the input data, the receiver further including a dV/dt detector circuit coupled to the receive node; receiving, by the transmitter, the input data; transmitting, by the transmitter, the intermediate data corresponding to the input data; receiving, by the receiver, the intermediate data; and producing, by the receiver, the output data corresponding to the input data at the output terminal.

In some embodiments, the method further includes detecting, by the dV/dt detector circuit, a rate of change of voltage with respect to time of a voltage at the receive node; and stopping the production of the output data at the output terminal when the dV/dt detector circuit detects a rate of change of voltage with respect to time greater than a predetermined threshold.

In some embodiments, the method further includes causing, by the second dV/dt detector circuit, the transmitter to send a refresh signal to the receiver when the second dV/dt detector circuit detects a rate of change of voltage at the transmission node that is less than a second predetermined threshold.

In some embodiments, the signal isolator includes a plurality of cross-coupled capacitors arranged in a common centroidal layout configuration.

In some embodiments, the transmitter is disposed on a first die and the receiver is disposed on a second die, the first and second dies being disposed in a common electronic package.

DETAILED DESCRIPTION OF THE INVENTION

Figure 1A:
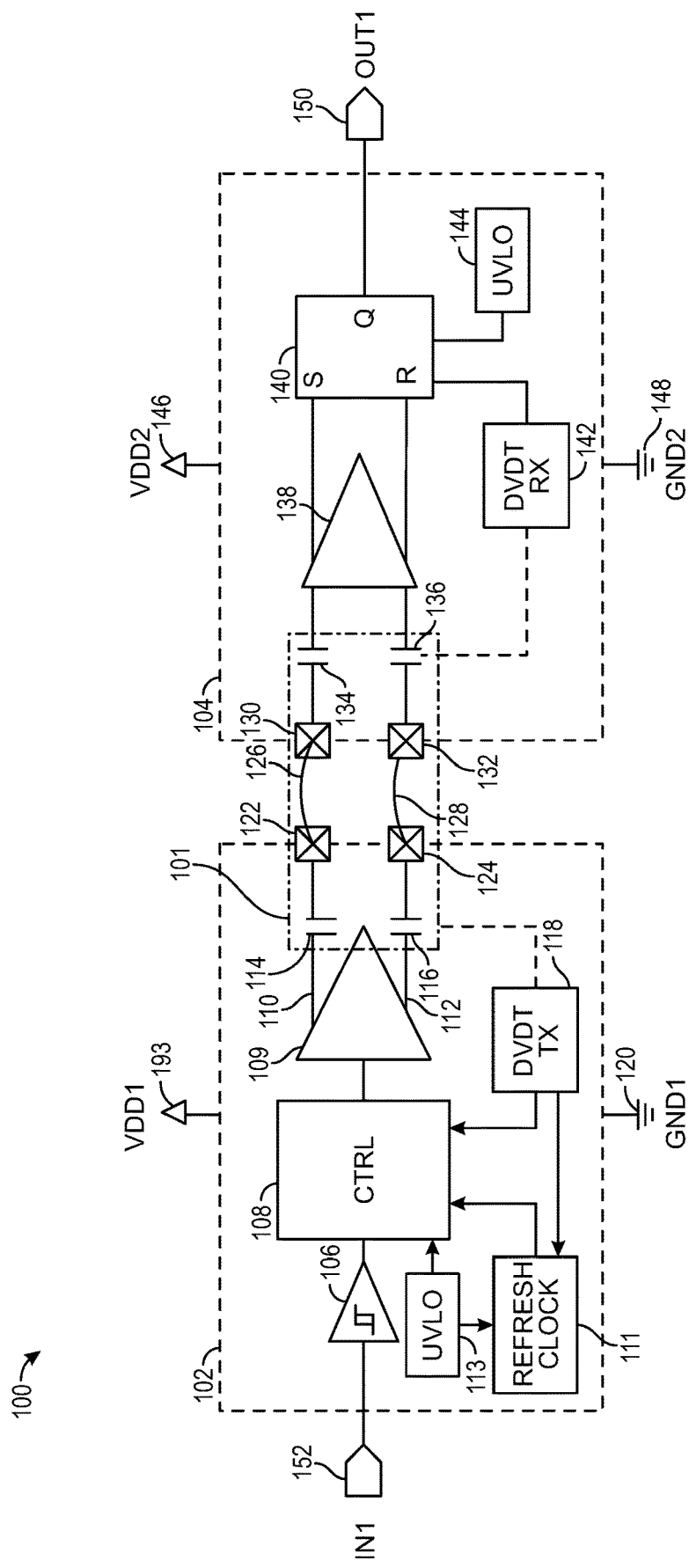
FIG. 1A illustrates a data communication channel having a signal isolator, according to an embodiment of the disclosure.

Circuits, structures, and related techniques disclosed herein relate generally to galvanic isolation in power converters. More specifically, circuits, devices and related techniques disclosed herein relate to systems and methods for signal isolation in power converters and traction inverters. In some embodiments, a power converter can include a data communication channel that has a transmitter, an isolator and a receiver. The transmitter may receive an input signal and generate an intermediate signal corresponding to the input signal that is transmitted through the isolator to the receiver. The receiver can generate output data corresponding to the input signal. In various embodiments, the receiver may include a dV/dt detector circuit that is arranged to detect a rate of change of voltage at the input of the receiver and is arranged to blank data transmission during relatively rapid rate of change of common-mode voltage with respect to time (dV/dt) events. The data communication channel may be further arranged to wait until the dV/dt event has passed before transmitting data. In some embodiments, the data communication channel may be a digital data communication channel.

In various embodiments, the transmitter can include a first dV/dt detector circuit, and the receiver can include a second dV/dt detector circuit. The second dV/dt detector circuit may be arranged to blank an output of the digital data communication channel such that the output of the receiver may not change during a relatively fast dV/dt event. The first dV/dt detector circuit may be arranged to detect an end of a relatively fast dV/dt event. Once end of a relatively fast dV/dt event has been detected, the transmitter can promptly send a refresh signal to the receiver. Each of the first and second dV/dt detector circuits can have a different threshold values. In some embodiments, the threshold for the second dV/dt detector circuit may be greater than the threshold for the first dV/dt detector circuit. The use of a dV/dt detector circuit in the transmitter together with generation of refresh signals can improve jitter at the output of the digital data communication channel and enable zero voltage switching (ZVS) in a half-bridge circuit used in power converters. Further, the receiver blanking feature can make the isolator immune to induced input digital noise during a relatively fast dV/dt event. Moreover, embodiments of the disclosure enable a substantial reduction in ringing and electromagnetic interference (EMI).

In some embodiments, a power converter may use compound semiconductor based switches such as gallium nitride (GaN) and/or silicon carbide (SiC)-based switches. These switches can operate at relatively high frequencies and can switch relatively fast compared to silicon-based switches, thus relatively fast dV/dt events may occur in these power converters causing substantial ringing and EMI. GaN-based and/or SiC-based power converters may experience relatively fast dV/dt events, for example, 100 V per nano second (100 V/ns) or higher. Current approaches to isolation in power converters may not be able to handle relatively fast dV/dt events, causing spurious data and/or erroneous data transfers between the transmit side and the receive side. Embodiments of the disclosure can handle relatively fast dV/dt events, thereby assuring integrity of data transfer, reducing ringing and reducing EMI. Further, embodiments of the disclosure can reduce parasitic elements in the data transmitting channel, further reducing ringing and EMI.

Techniques disclosed herein enable use of different paths for data and common mode transient currents. Embodiments of the disclosure may use a single common top metal plate that is arranged as a bonding pad and as a top plate for isolation capacitors used in the transmission channel. Multiple bottom metal plates may be used to form the bottom plates for the isolation capacitors. In various embodiments, a common centroid layout can be used for these capacitors to improve mismatches caused by fabrication process variations. In certain embodiments, a non-common-centroid layout may be used for the isolation capacitors. In some embodiments, the use of transmitter and receiver dV/dt detector circuits, blanking circuits and refreshing circuits can enable operation of power converters at relatively high frequencies with relatively high voltage isolations. In some embodiments, mismatch compensation capacitors may be added to the isolation capacitor structures in order to mitigate parasitic capacitances that may be present in the semiconductor package used for packaging the transmitter and receiver dies. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1A illustrates a data communication channel 100 according to an embodiment of the disclosure. The data communication channel 100 can include a transmitter 102, an isolator 101 and a receiver 104. In some embodiments, the data communication channel may be referred to as a digital data communication channel. In various embodiments, the isolator 101 may be referred to as a digital isolator. The transmitter 102 may have an input terminal 152 arranged to receive input data IN1 and transmission nodes 110 and 112 arranged to transmit intermediate data corresponding to the input data. The receiver can include receive nodes that are arranged to receive the intermediate data and an output terminal 150 arranged to produce output data OUT1 corresponding to the input data. The receiver can further include a dV/dt detector circuit 142 coupled to the receive nodes and arranged to stop the production of the output data OUT1 at the output terminal 150 when the dV/dt detector circuit detects a rate of change of voltage with respect to time greater than a predetermined threshold.

The isolator 101 may include isolation capacitors that can isolate voltage domains of the transmitter 102 from that of the receiver 104. In some embodiments, the isolator 101 may have a transmit side coupled to the transmitter 102 and a receive side coupled to the receiver 104. The isolator 101 can include a first isolation capacitor 114 and a second isolation capacitor 116, where the first and second isolation capacitors 114 and 116 may be coupled to the transmitter 102. The isolator 101 can further include a third isolation capacitor 134 and a fourth isolation capacitor 136, where the third and fourth isolation capacitors may be coupled to the receiver 104. The first isolation capacitor 114 can be coupled to terminal 122, the second isolation capacitor 116 can be coupled to terminal 122, the third isolation capacitor 134 can be coupled to terminal 130 and the fourth isolation capacitor 136 can be coupled to terminal 132. Terminal 122 may be coupled to terminal 130 by a first wire bond 126. Terminal 124 may be coupled to terminal 132 by a second wire bond 128.

The first and second isolation capacitors 114 and 116, respectively, can form a first isolation barrier and the third and fourth isolation capacitors, respectively, can form a second isolation barrier. The transmitter 102 may operate with respect to a first ground node 120. The receiver 104 may operate with respect to a second ground node 148. The first ground and the second ground may be galvanically isolated by the isolator 101. The data communication channel 100 may be arranged to communicate data from the first voltage domain to the second voltage domain. In some embodiments, the data communication channel 100 may be arranged to communicate digital data from the first voltage domain to the second voltage domain. In various embodiments, the transmitter 102 may receive an input signal that takes one of two binary voltage levels. Input signal may also be referred to as input data, or just data. The transmitter 102 may generate a first signal corresponding to the input signal. The first signal may be carried by the isolator 101 from the first voltage domain to the second voltage. The receiver 104 may receive signals from the isolator and generate output signals from the received signals.

In some embodiments, data may be transmitted across the isolator 101 by any of a variety of techniques, including, for example, on-off keying, pulse count modulation, pulse polarity modulation, and the like. In on-off keying, if the input signal corresponds to a binary value of "1," the transmitter 102 may generate a periodic signal at its output; but, if the input signal corresponds to a binary value of "0," the transmitter 102 may output an inert signal (no activity). Pulse count modulation may involve transmission of a single pulse signal to represent a first binary value (e.g., a digital "0") and a multi-pulse signal to represent a second binary value (a digital "1"). Pulse polarity modulation may involve transmission of a pulse with a first polarity to represent a first binary value (e.g., a positive pulse to represent a digital "1") and a pulse with a second polarity to represent a second binary value (e.g., a negative pulse to represent a digital "0"). Embodiments of the disclosure can be used in applications with any differentially driven isolator structure. Further, embodiments of the disclosure may utilize a relatively short positive pulse (when the steady state is low which can allow a positive pulse) that may generate a SET on a receiver RS gate. A short negative pulse (when steady state is high, which can allow a negative pulse) may generate a RESET. A transition from positive to negative pulse may use a single edge to change the steady state level. In some embodiments, a transition between the two steady states can be distinguished over short positive or negative pulse when delay constrains are present.

Transmitter 102 can include an input terminal 152 arranged to receive an input signal, and a differential output terminal having terminal 122 and terminal 124. The transmitter 102 can be coupled to a power supply terminal 193 and a first ground node 120. A first bond wire 126 may connect terminal 122 to terminal 130 of the receiver 104, and a second bond wire 128 may connect terminal 124 to terminal 132 of receiver 104. The first and second bond wires 126 and 128, respectively, may be a single bond wire or a plurality of bond wires or any other techniques that can electrically interconnect pads of 2 isolated nearby dies (e.g., flip-chip technique). The receiver 104 can include terminals 130 and 132 that are arranged to receive a differential signal from the transmitter 102. The receiver 104 can be coupled to a power supply terminal 146 and a second ground node 148. The receiver 104 can also include an output terminal 150. In some embodiments, the input of the transmitter may include various inputs, for example, IN+, IN− and Enable. The IN+ and IN− can be used to control polarity and may be used for non-cross conduction purposes when using 2 isolators in a power half-bridge circuit. The Enable input can enable emergency turn-off of the half-bridge circuit in cases, such as but not limited to, short-circuit and/or over current condition. In various embodiments, IN+, IN− and Enable inputs may be combined to generate a single digital signal at the input terminal 152 that can be transmitted across the isolator.

Transmitter 102 can further include a Schmitt trigger 106 coupled to the input terminal 152. In some embodiments, Schmitt trigger 106 may be a buffer. Schmitt trigger 106 can have hysteresis. The transmitter 102 can include a control circuit 108 that is coupled to the Schmitt trigger 106. The transmitter 102 can also include a drive circuit 109 that is coupled to the control circuit 108, and has a differential output with a first output node 110 and a second output node 112. The first and second output nodes 110 and 112, respectively, can be coupled to the first isolation capacitor 114 and the second isolation capacitor 116. The first and second isolation capacitors can be arranged to act as a first isolation barrier and acts as a high pass filter. The first isolation capacitor 114 can be coupled to the terminal 122 and the second isolation capacitor 116 can be coupled to the terminal 124. The transmitter 102 can include a first dV/dt detector circuit 118 that can be coupled to the first and second isolation capacitors 114 and 116, and to the control circuit 108. In some embodiments, the first dV/dt detector circuit 118 can be coupled to auxiliary bottom capacitors. The transmitter 102 can also include a refresh clock circuit 111 coupled to the control circuit 108. In some embodiments, clock circuit 111 can be arranged to have dithering, which can be used for electromagnetic compatibility (EMC) improvement. The transmitter 102 can further include a first under voltage lockout (UVLO) circuit 113 that is coupled to the control circuit 108.

Receiver 104 can include terminals 130 and 132 arranged to receive differential signals from the transmitter 102. The receiver 104 can include a comparator 138 coupled to the third and fourth capacitors 134 and 136. The comparator 138 can be coupled to a latch circuit 140. In some embodiments, the latch circuit 140 can be a set-reset (SR) latch. The receiver 104 can include a second dV/dt detector circuit 142 that can be coupled to the third and fourth capacitors 136 and 134, where the receiver can be arranged to control the latch circuit 140. The receiver 104 can also include a second UVLO circuit 144 that is coupled to the latch circuit 140.

Transmitter 102 can be arranged to receive input data at input terminal 152 and transmit differential output data across the isolator 101. The receiver 104 can be arranged to receive the differentially transmitted data at terminals and generate an out signal at the output terminal 150. The transmitter 102 and the receiver 104 can be arranged such that when a rate of dV/dt between first ground node 120 and second ground node 148 exceeds a second predetermined threshold value, the receiver 104 may be disabled, and such that when a rate of dV/dt falls below a first predetermined threshold value, the transmitter 102 can refresh and resume transmitting data. The first dV/dt detector circuit 118 can have a first predetermined threshold setting value and may be arranged to detect a dV/dt event by use of the first and second isolation capacitors 114 and 116. In some embodiments, the first dV/dt detector circuit 118 can be arranged to detect a dV/dt event by use of auxiliary bottom capacitors. When a rate of dV/dt falls below the first predetermined threshold value, the first dV/dt detector circuit 118 can send a signal to the control circuit 108 to enable transmission of data. The second dV/dt detector circuit 142 can have a second determined threshold setting value and may be arranged to detect the dV/dt event by the isolation capacitors 134 and 136. When the rate of dV/dt exceeds the second predetermined threshold value, the second dV/dt detector circuit 142 can send a signal to the latch circuit 140 to disable the propagation of the S and R pulses across 140 to the output terminal 150, which can enable a data blanking feature of the disclosed embodiments.

In some embodiments, the first dV/dt detector circuit 118 can detect an end of a relatively fast dV/dt so that the transmitter 102 can promptly send a refresh signal to the receiver 104, knowing that the receiver 104 may be active since the second dV/dt detector's' threshold setting may be higher. The refresh clock circuit 111 is arranged to provide a refresh clock pattern to the control circuit 108. In switching applications, the use of the first dV/dt detector circuit 118 along with a refresh pattern can allow for zero voltage switching (ZVS) when used in a half-bridge topology. The transmitter 102 can also be arranged to blank the transmitted signal.

In this way, the data channel 100 can be immune to any induced input digital noise on 152 during a relatively fast dV/dt between 120 and 148 grounds. As an example, a fast dV/dt may have a value of 100 V per nano second (100 V/ns) or higher. In some embodiments, a fast dV/dt may also be referred to as a high dV/dt.

In some embodiment a value of the threshold voltage setting for the first dV/dt detector circuit 118 can be between 5 V/ns and 8 V/ns, while in other embodiments the value can be 1 V/ns to 2 V/ns, however one of skill in the art will appreciate that the invention is not limited to the aforementioned threshold voltage setting values and other threshold voltage settings can be used. In one embodiment a value of the threshold voltage setting for the second dV/dt detector circuit 142 can be between 8 V/ns and 12 V/ns, while in other embodiments the value can be 2 V/ns to 4 V/ns, however one of skill in the art will appreciate that the invention is not limited to the aforementioned threshold values and other threshold values can be used.

First UVLO circuit 113 can be arranged to detect power supply voltage and if the power supply voltage drops below the first UVLO detection voltage, the first UVLO circuit 113 can bring the operation of the control circuit 108 into a semi-standby state to prevent malfunction. Prior going to standby, 108 may send a last RESET command to 104 so that 150 goes low when transmitter 102 supply is relatively low. At the end of an under voltage lock-out event, a refresh clock can be triggered by the first UVLO circuit 113 on 111. The second UVLO circuit 144 can be arranged to detect power supply voltage and when the power supply voltage drops below the second UVLO detection voltage, the second UVLO circuit 144 can generate a reset event, then, put the latch circuit 140 into a semi-standby state to prevent malfunction. In some embodiments, the threshold voltage settings for the first and second dV/dt detectors can be fixed values, while in other embodiments the threshold voltage settings can be adjustable and can be set by a user using external components. If no data change nor refresh is detected by 138 during a time period equivalent to several refresh clock period, a Reset signal is automatically generated in latch circuit 140. This is a watchdog feature.

Figure 1B:
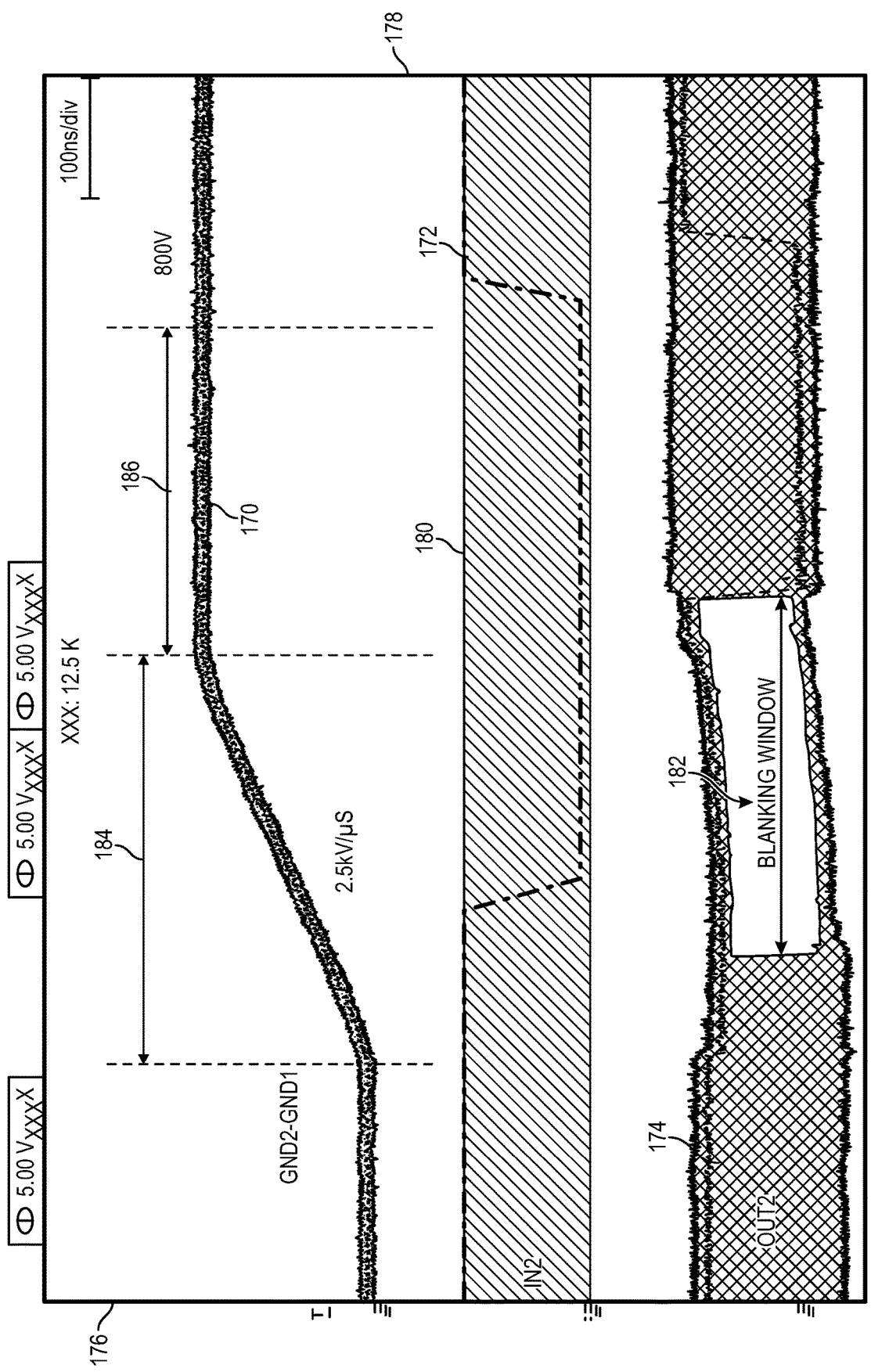
FIG. 1B shows an exemplary signal diagram for the data communication channel of FIG. 1A, the illustrating a blanking feature of the data communication channel, according to some embodiments.

FIG. 1B shows an example of a signal diagram for the data communication channel 100. The signal diagram shows voltage 176 as a function of time 178. Graph 170 shows a dV/dt event between GND2 and GND1 nodes. In a first time period 184, the dV/dt of 2500 V/us exists between GND2 and GND1. Graph 172 shows an input signal IN2 and graph 174 shows an output signal OUT2. Graph 180 shows a large amount of asynchronous IN2 data, where 172 is only one of them and is highlighted. During the first time period 184, the second dV/dt detector circuit 142 can blank the output signal OUT2 for any IN2 (180) transitions from high to low or low to high, as seen in blanking window 182 where all the asynchronous output signal OUT2 stay high or low (i.e., there is no transition during 184). In a second time period 186 where the dV/dt drops substantially, the second dV/dt detector circuit 142 does not blank the signal, while the first dV/dt detector circuit 118 sends refresh signal to the receiver such that the output signal OUT2 (174) goes low and starts tracking the input signal IN2 (172).

Figure 2:
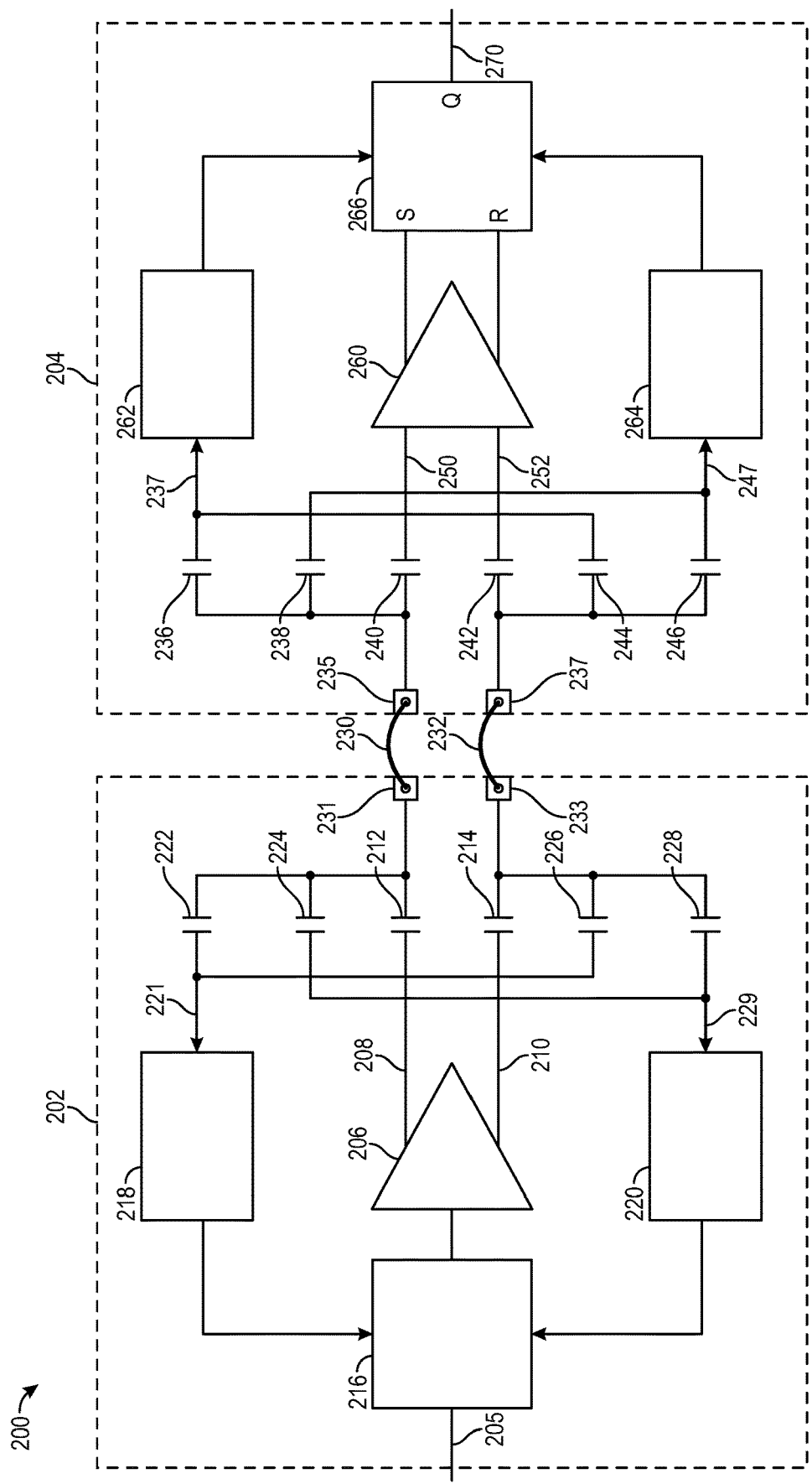
FIG. 2 illustrates a data communication channel with cross-coupled isolation capacitors according to an embodiment of the disclosure.

FIG. 2 illustrates a data communication channel 200 with cross-coupled isolation capacitors according to an embodiment of the disclosure. The data communication channel 200 is similar to the data communication channel 100 and can include a transmitter 202, a first bond wire 230 and a second bond wire 232, and a receiver 204. Transmitter 202 can include an input terminal 205 arranged to receive an input signal, and a differential output terminal having terminals 231 and terminal 233. A first bond wire 230 may connect terminal 231 to terminal 235 of the receiver 204, and a second bond wire 232 may connect terminal 233 to terminal 237 of the receiver 204. The first and second bond wires 230 and 232, respectively, may be a single bond wire or a plurality of bond wires, or may use other methods of interconnection. The receiver 204 can include terminals 235 and 237 that are arranged to receive a differential signal from the transmitter 202. The receiver 204 can include an output terminal 270.

Transmitter 202 can further include a first common mode transient detector 218 having its input terminal 221 coupled to a capacitor 222 and a capacitor 226. The output of the first common mode transient detector 218 can be coupled to a logic circuit 216. Transmitter 202 can further include a second common mode transient detector 220 having its input terminal 229 coupled to a capacitor 228 and a capacitor 224. The output of the second common mode transient detector 220 can be coupled to the logic circuit 216. Transmitter 202 can also include a driver circuit 206 having its input coupled to the logic circuit 216. The driver circuit 206 can have a differential output with terminals 208 and 210, where terminal 208 can be coupled to a capacitor 212 and terminal 210 can be coupled to a capacitor 214. Transmitter 202 can include terminal 231 that is coupled to capacitors 212, 224 and 222, and terminal 233 that is coupled to capacitors 214, 226 and 228.

Capacitors 222, 224, 212, 214, 226 and 228 may be arranged to act as a first isolation barrier. The first common mode transient detector 218 may be arranged to detect positive dV/dt events at its input terminal 221 by use of capacitors 222 and 226. The second common mode transient detector 220 may be arranged to detect negative dV/dt events at its input terminal 229 by use of capacitors 224 and 228. Driver circuit 206 can be arranged to drive signals through capacitors 212 and 214 to terminals 231 and 233, respectively. In the illustrated embodiment, different paths are used for data and for common mode transient current, while not adding extra bonding wires between the transmitter 202 and the receiver 204. Embodiments of the present disclosure enable forming capacitors for data transmission and for common mode transient current transfer by using a single bond wire. This is advantageous over current approaches that may use multiple bond wires that have more parasitic capacitance, and that may utilize larger die size and higher assembly cost. Current approaches may use capacitors for data and dV/dt detection, which can make it the dV/dt detection relatively difficult and relatively less optimum detection.

A single common top plate that may be used as a bond pad and several bottom plates can be utilized to form capacitors 222, 224, 212, 214, 226 and 228. The largest bottom plate that forms capacitors 212 and 214, can be used for data transmission. Capacitors 222 and 226 can be used for positive dV/dt detection and capacitors 224 and 228 can be used for negative dV/dt detection, where capacitors 222, 226, 224 and 228 can be formed by relatively smaller bottom plates, respectively. In some embodiments, the size of the capacitors 222, 226, 224 and 228 can be, for example, about one eight to one tenth of the size of the capacitors 212 or 214. By using capacitors 222 and 226, input terminal 221 of the first common mode transient detector 218 may not see any signal coming from the differential data path. Similarly, by using capacitors 224 and 228, input terminal 229 of the second common mode transient detector 220 may not see any signal coming from the differential data path.

Receiver 204 can include a third common mode transient detector 262 having its input terminal 237 coupled to a capacitor 236 and a capacitor 244. The output of the third common mode transient detector 262 can be coupled to a SR latch 266. Receiver 204 can further include a fourth common mode transient detector 264 having its input terminal 247 coupled to a capacitor 246 and a capacitor 238. The output of the fourth common mode transient detector 264 can be coupled to the SR latch 266. Receiver 204 can also include a comparator 260 having an input terminal 250 coupled to capacitor 240 and an input terminal 252 coupled to capacitor 242. Comparator 260 may have differential output terminals that drive the SR latch 266. Receiver 204 can also have terminals 235 and 237 that are arranged to receive signals from the transmitter. Terminal 235 can be coupled to capacitors 236, 238 and 240, while terminal 237 can be coupled to capacitors 242, 244 and 246. Receiver 204 may have an output terminal 270 arranged to provide output data.

Capacitors 236, 238, 240, 242, 244 and 246 may be arranged to act as a second isolation barrier. The third common mode transient detector 262 may be arranged to detect positive dV/dt events at its input terminal 237 by use of capacitors 236 and 244. The fourth common mode transient detector 264 may be arranged to detect negative dV/dt events at its input terminal 247 by use of capacitors 238 and 246. Comparator 260 can be arranged to receive signals through capacitors 240 and 242, and drive the SR latch 266. In the illustrated embodiment, different paths are used for data and for common mode transient current, while not adding extra bonding wires between the transmitter 202 and the receiver 204.

A single common top plate that may be used as a bond pad and several bottom plates can be utilized to form capacitors 236, 238, 240, 242, 244 and 246. The largest bottom plate that forms capacitors 240 and 242, can be used for data transmission. Capacitors 236 and 244 can be used for positive dV/dt detection and capacitors 238 and 246 can be used for negative dV/dt detection. Capacitors 236, 238, 244 and 246 can be formed by relatively smaller bottom plates. In some embodiments, the size of the capacitors 236, 238, 244 and 246 can be, for example, about one eight to one tenth of the size of the capacitors 240 or 242. By using capacitors 236 and 244, input terminal 237 of the third common mode transient detector 262 may not see any signal coming from the differential data path. Similarly, by using capacitors 238 and 246, input terminal 247 of the fourth common mode transient detector 264 may not see any signal coming from the differential data path.

Figure 3:
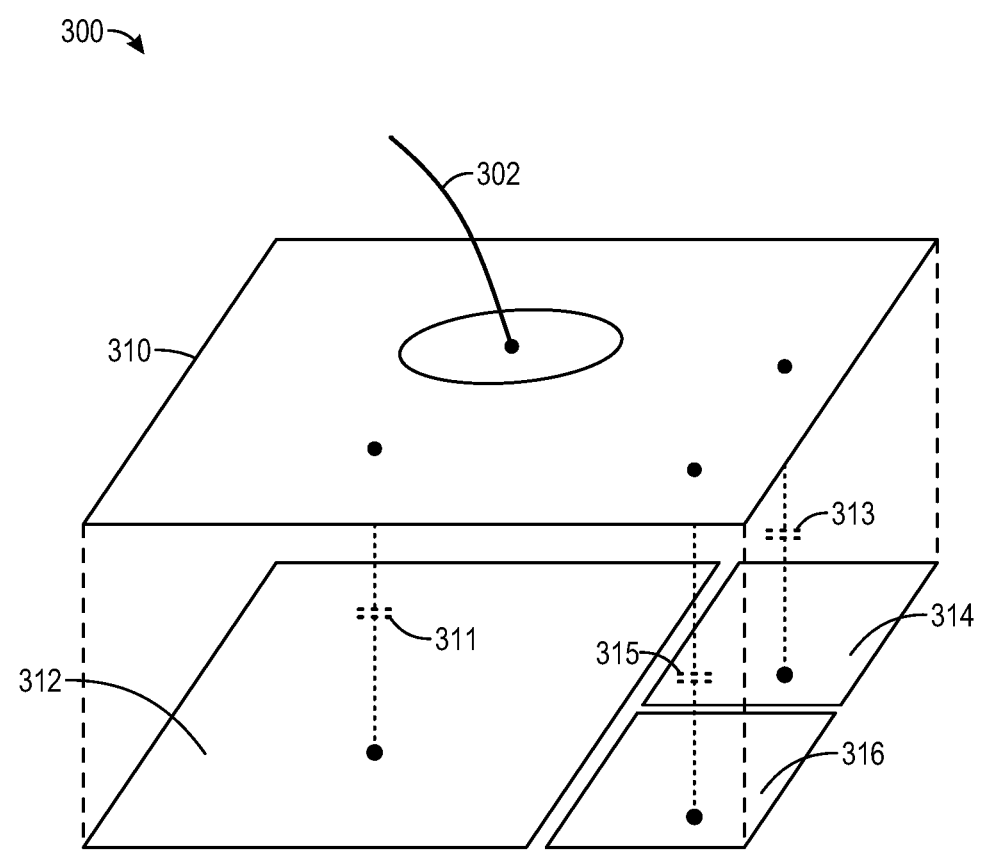
FIG. 3 shows an isometric view of a high voltage capacitor structure having a common top plate and split bottom plates for data and common-mode transient detection according to certain embodiments.

FIG. 3 shows an isometric view of a high voltage capacitor structure 300 having a common top plate and split bottom plates for data and common-mode transient detection according to certain embodiments. The high voltage capacitor structure 300 can include a top plate 310, and a bottom plate 312, 314 and 316. The top plate 310 can be coupled to a bond wire 302, and/or may utilize other interconnection methods. In some embodiments, bond wire 302 can be a single bond wire or a plurality of bond wires. The bottom plate 312 can be the largest of the three bottom plates and can be arranged to form a capacitor 311 that may be used for data transmission. Bottom plates 314 and 316, can be relatively small and can be used to form capacitors 313 and 315, respectively. Capacitors 313 and 315 can be used for positive and negative dV/dt detection. In some embodiments, the bottom plates 312, 314 and 316 may be larger than the top plate area 310 to collect most of side effect electric fields. This can optimize the high voltage capacitor values of 311, 313 and 316 for a given top plate area 310.

Figure 4A:
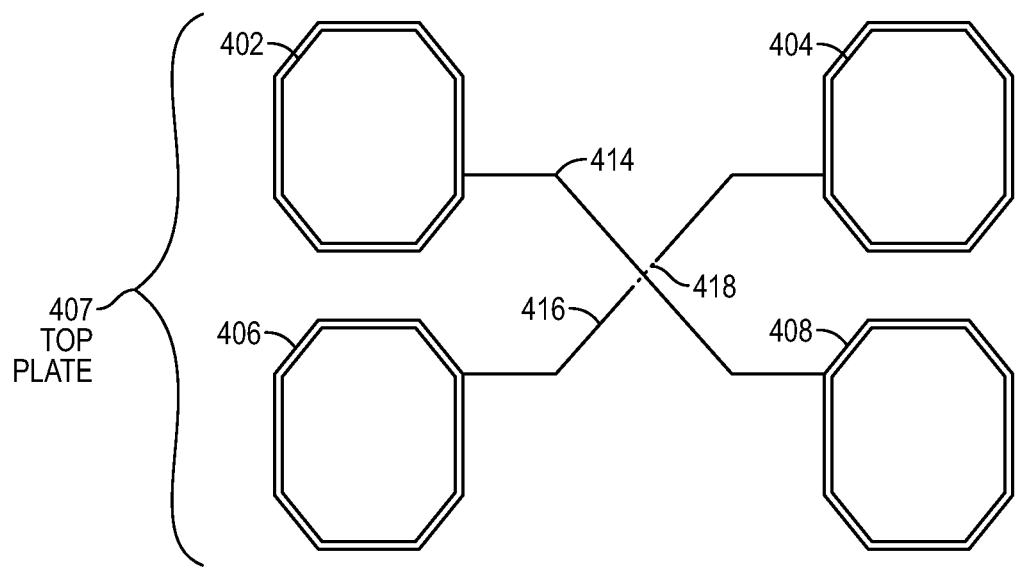
FIGS. 4A and 4B show plan views of a high voltage common centroid layout implementation of differential capacitors according to certain embodiments.
Figure 4B:
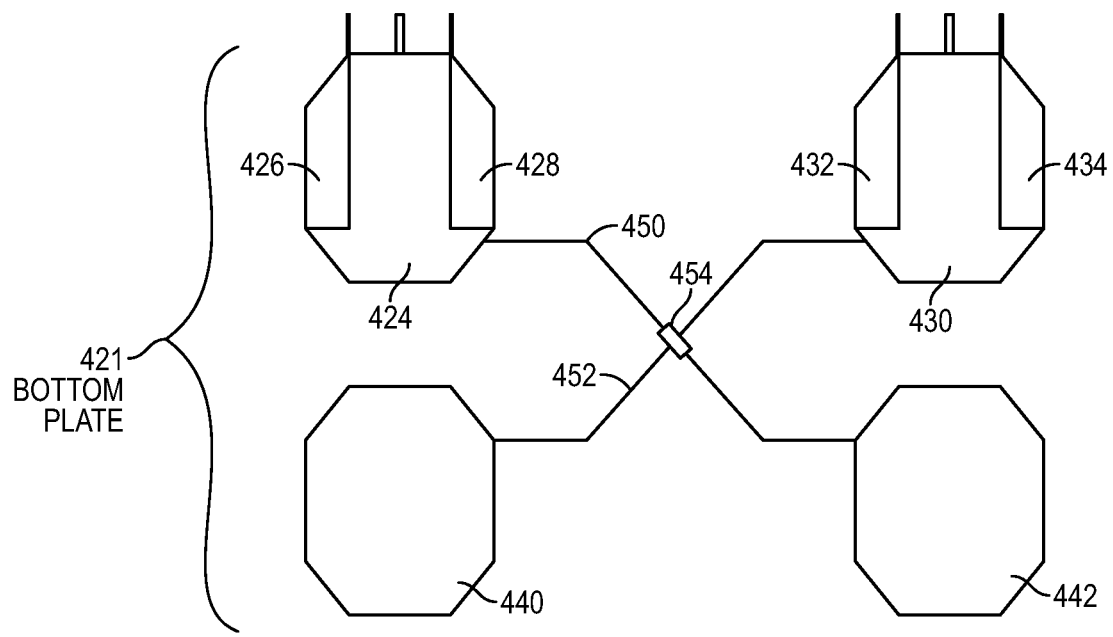

FIGS. 4A and 4B show plan views of a high voltage common centroid layout implementation of differential capacitors according to certain embodiments. FIGS. 4A and 4B show differential implementation of the capacitors, i.e., the number of capacitors is twice that of the capacitors shown in FIG. 3. FIG. 4A shows plan view of top plate 407 layout. The top plate 407 can include top pad structures 402 and 408. Top pad structures 402 and 408 can be coupled by an interconnect 414. Top pad structures 402 and 408 can form the top plate of a first differential capacitor. Top pad structure 402, 408 and interconnect 414 can be formed, for example, in a metal 4 layer. The shape of the top pad structures 402 and 408 can be hexagonal, rectangular or any other suitable shapes. In some embodiments, the signal isolator may include a plurality of cross-coupled capacitors. In various embodiments, the signal isolator may include a plurality of non-cross-coupled capacitors. In some embodiments, the capacitors may be formed from metal metal-insulator-metal (MIM) or other conductive semiconductor layers, such as polysilicon or highly doped polysilicon layers along with insulator layers.

Top pad structures 404 and 406 can be coupled by an interconnect 416. Top pad structure 404 and 406 can form the top plate of a second differential capacitor. Top pad structures 404, 404 and interconnect 416 can be formed, for example, in a metal 4 layer, however at the cross-over point 418, interconnect 416 uses a different level metal layer, such as metal 3, to bypass the cross-over point while keeping high voltage isolation. The shape of the top pad structures 404 and 406 can be hexagonal, rectangular or any other suitable shapes.

FIG. 4B shows plan view of bottom plate 421 layout. The bottom plate 421 can include bottom pad structures 424, 426, 428, and 442. Bottom pad structures 424 can be coupled by an interconnect 450 to the bottom pad structure 442. Bottom pad structure 424 can form a portion of the first differential capacitor with top pad structure 402, while bottom pad structure 442 can form a remaining portion of the first differential capacitor with top pad structure 408. Bottom pad structure 430 can form a portion of the second differential capacitor with top pad structure 404, while bottom pad structure 440 can form a remaining portion of the second differential capacitor with top pad structure 406. Bottom pad structure 424 can be coupled to the bottom pad structure 442 by an interconnect 450. Bottom pad structure 430 can be coupled to the bottom pad structure 440 by an interconnect 452. These bottom pad structure can be formed, for example, in a lower level metal layer such as metal 1 in order to have high voltage isolation. At the cross-over point 454, the interconnect 452 may bypass the cross-over point by using a different conductive layer, such as, for example, a metal 2 layer. In some embodiments, cross-over point 418 may not overlap cross-over point 454 in order to maintain high voltage rating. The shape of the bottom pad structures 424, 442, 430 and 440 can be hexagonal, rectangular or any other suitable shapes.

Bottom pad structure 426 may form a relatively small capacitor with top pad structure 402 that is used in dV/dt detection, similar to capacitor 222. Bottom pad structures 428 may form a relatively small capacitor with top pad structure 402 that is used in dV/dt detection, similar to capacitor 224. Bottom pad structures 432 may form a relatively small capacitor with top pad structure 404 that is used in dV/dt detection, similar to capacitor 226. Bottom pad structures 434 may form a relatively small capacitor with top pad structure 402 that is used in dV/dt detection, similar to capacitor 228. Bottom pad structures 426, 428, 432 and 434 can be formed in a lower level metal layer, for example, metal 1. Use of lower level metal layers can be advantageous as they have higher isolation voltage as opposed to the top metal (e.g., Metal 4).

Use of common-centroidal layout of the capacitors can also enable relatively high level of matching between the differential capacitors. This technique can enable the disclosed embodiments to be able to handle relatively high dV/dt events, even without use of the blanking feature described above. As an example, this technique can enable 10 kV/us. Furthermore, by breaking up the plates of the capacitor into two, metal density issues that may exist in a fabrication process can be improved.

The first common mode transient detector 218 in FIG. 2 is configured to detect common mode currents. To prevent relatively large input voltage swing at the input terminal 221 of the first common mode transient detector 218, a low input impedance common mode current detector can be implemented according to certain embodiments. In this way, the parasitic bottom capacitance (e.g., parasitic bottom capacitance of Metal 1 layer) may have negligible effect on the performance of the circuit.

Figure 5:
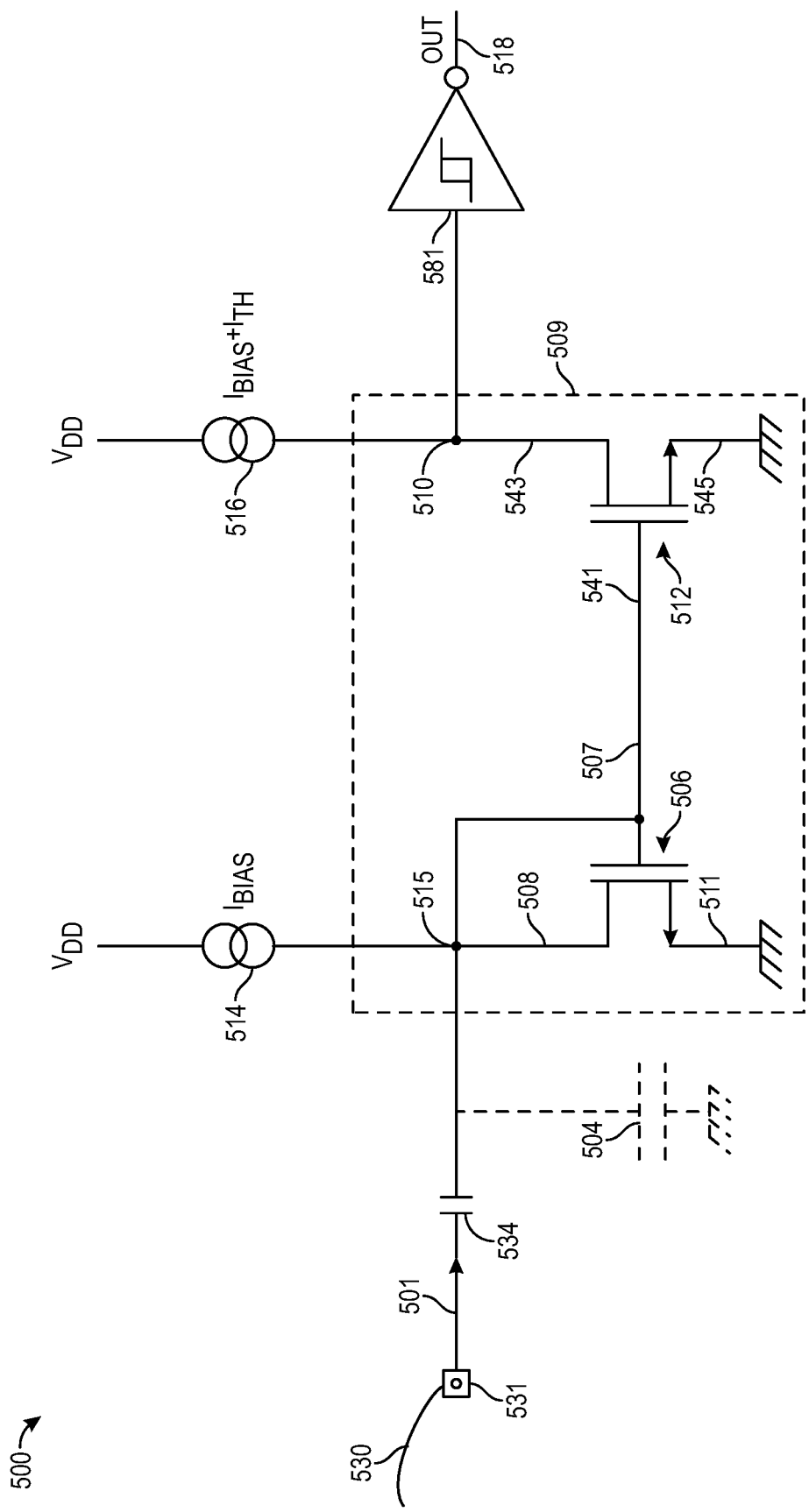
FIG. 5 shows a schematic of a common mode current detector 500 with relatively low input impedance according to certain embodiments.

FIG. 5 shows a schematic of a common mode current detector 500 with relatively low input impedance, according to some embodiments of the disclosure. The common mode current detector 500 can be utilized as a relatively fast dV/dt detector circuit. The common mode current detector 500 can be coupled to terminal 531 and to bond wire 530 via capacitor 534. In some embodiments, capacitor 534 may be equal to a sum of capacitors 222 and 226 of FIG. 2. An input stage of the common mode current detector 500 can be configured as a low input impedance stage such that the input impedance of the common mode current detector 500 can have a relatively low input impedance. The common mode current detector 500 can be configured to detect a common mode current 501 entering the terminal 531. The common mode current detector 500 can include an input transistor 506 having a gate terminal 507, a drain terminal 508 and a source terminal 511. Gate terminal 507 may be coupled to the drain terminal 508. The source terminal 511 may be grounded.

A bias current generator 514 can generate $I_{BIAS}$ current in order to properly bias the input transistor 506. In this way, an input impedance at node 515 can be kept at a relatively low value such that any parasitic capacitance 504 may not sink any useful current from 534 at node 515. The transistor 506 may be configured in a current mirror 509 arrangement with transistor 512. Transistor 512 can have a gate terminal 541 coupled to gate terminal 507, and a drain terminal 543 and source terminal 545. A current bias generator 516 can be coupled to node 510. Node 510 can be coupled to a comparator 581, where the comparator 581 can be coupled to an output terminal 518. In some embodiments, the comparator 581 may be a Schmitt trigger. The current bias generator 516 can generate $I_{BIAS}+I_{TH}$ current, where $I_{TH}$ is a threshold current. When a sum of the common mode current 501 and $I_{BIAS}$ into node 515 exceeds $I_{BIAS}+I_{TH}$ current into node 510, comparator 581 can trigger and disable the RS gate of the receiver 204 or enable a refresh on the transmitter at the end of the detected dV/dt event.

Figure 6:
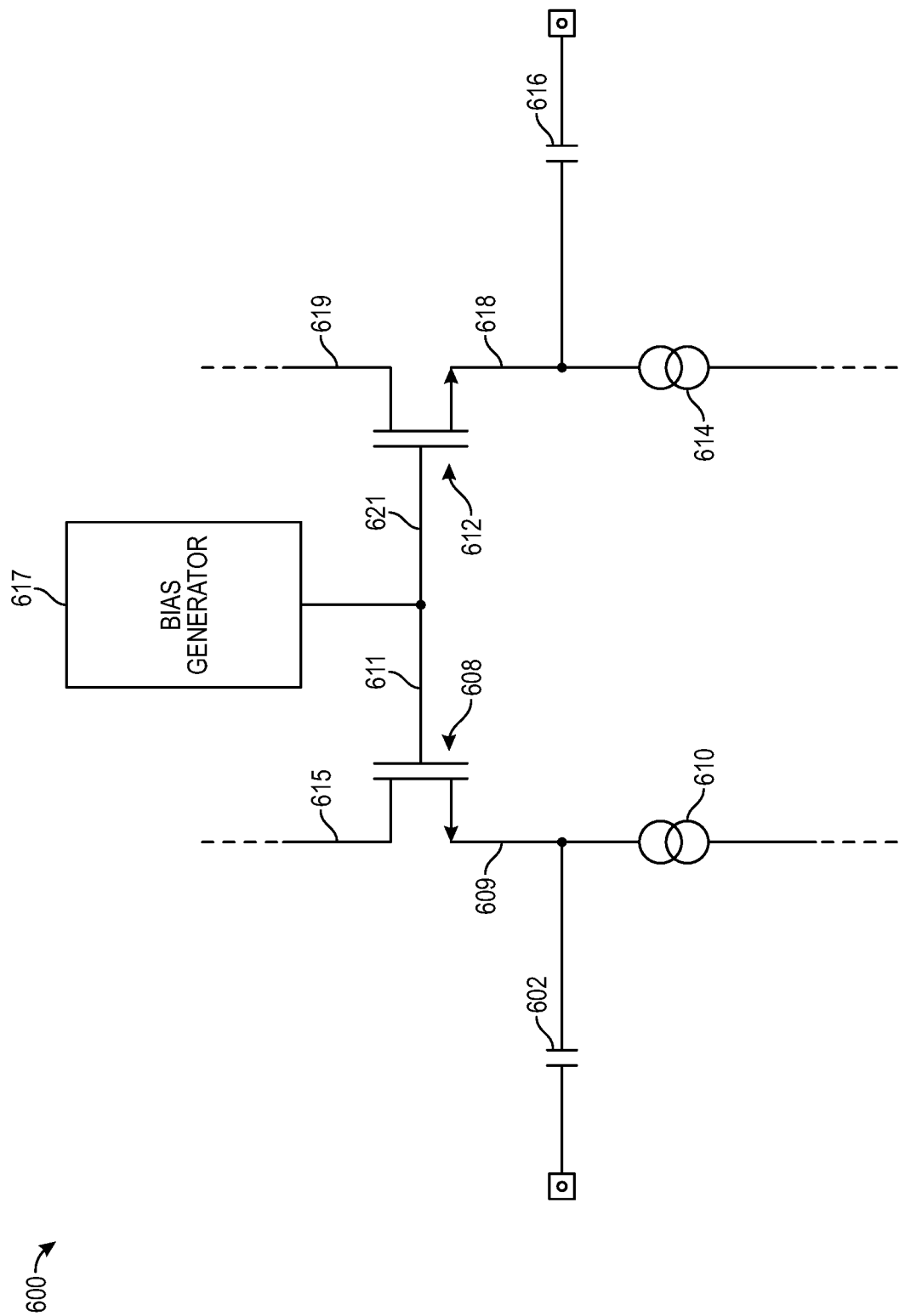
FIG. 6 shows a schematic of a low input impedance comparator according to certain embodiments.

Comparator 260 in FIG. 2 can be arranged to receive signals through capacitors 240 and 242, and drive the SR latch 266. To prevent current losses in bottom plates parasitic capacitors to ground at the input terminals 250 and 252, a low input impedance comparator can be implemented according to certain embodiments. FIG. 6 shows a schematic of a low input impedance comparator 600. The input stage of the comparator 600 can include a transistor 608 having a source terminal 609, a gate terminal 611 and a drain terminal 615. Transistor 608 can be arranged in a common gate configuration. Source terminal 609 can be coupled to a capacitor 602. A bias current generator 610 can be coupled to the source terminal 609, thereby biasing the transistor 608 in a proper region of operation. The gate terminal 611 may be coupled to a bias generator 617 to bias the gate terminal 611. Transistor 608 can be coupled to transistor 612 with a gate terminal 621, a source terminal 618 and drain terminal 619. A bias current generator 614 can be coupled to the source terminal 618 to properly bias the transistor 612. The source terminal 618 can be coupled to a capacitor 616. When a current enters the low input impedance comparator 600 through capacitor 602, the current may enter the source terminal 609 and travel to drain terminal 615. Bias current generators 610 and 614 could also be implemented by using a resistor(s) to generate the current sources.

Embodiments of the disclosure can allow for automatic zero voltage switching (ZVS) and automatic cross-conduction prevention of high-side and/or low-side switches used in half-bridge topology. A driver logic can transmit a "0" to a gate driver, while a "1" is used to pre-trigger the gate driver output. Once pre-triggered, the output of the gate driver can go high after a minimum predefined dead time ($T_E$) as soon as either: 1) optional feedback from a desaturation detector circuit (DESAT detector) is lower than a predefined voltage threshold, or 2) the circuit receives a confirmation that there is not a relatively strong dV/dt event occurring and that the other channel is effectively OFF so that no cross-conduction may occur. A communication channel between the high-side and the low-side may use a non-differential high voltage capacitive coupling utilizing bi-directional OOK modulation. When either the high-side or the low-side is OFF, it can apply a high-frequency carrier on the high voltage isolation capacitor. In some embodiments, the high voltage capacitor can include two or more serially coupled capacitors. Each of the high-side and low-side may continuously detect if it receives an OOK signal on its capacitive node. An OOK signal may not be received on the capacitive node because either the other side is active or there may be a dV/dt event that has a magnitude that is larger than a pre-defined threshold, which can cause the input to be clamped so that an OOK signal may not be detected.

Figure 7:
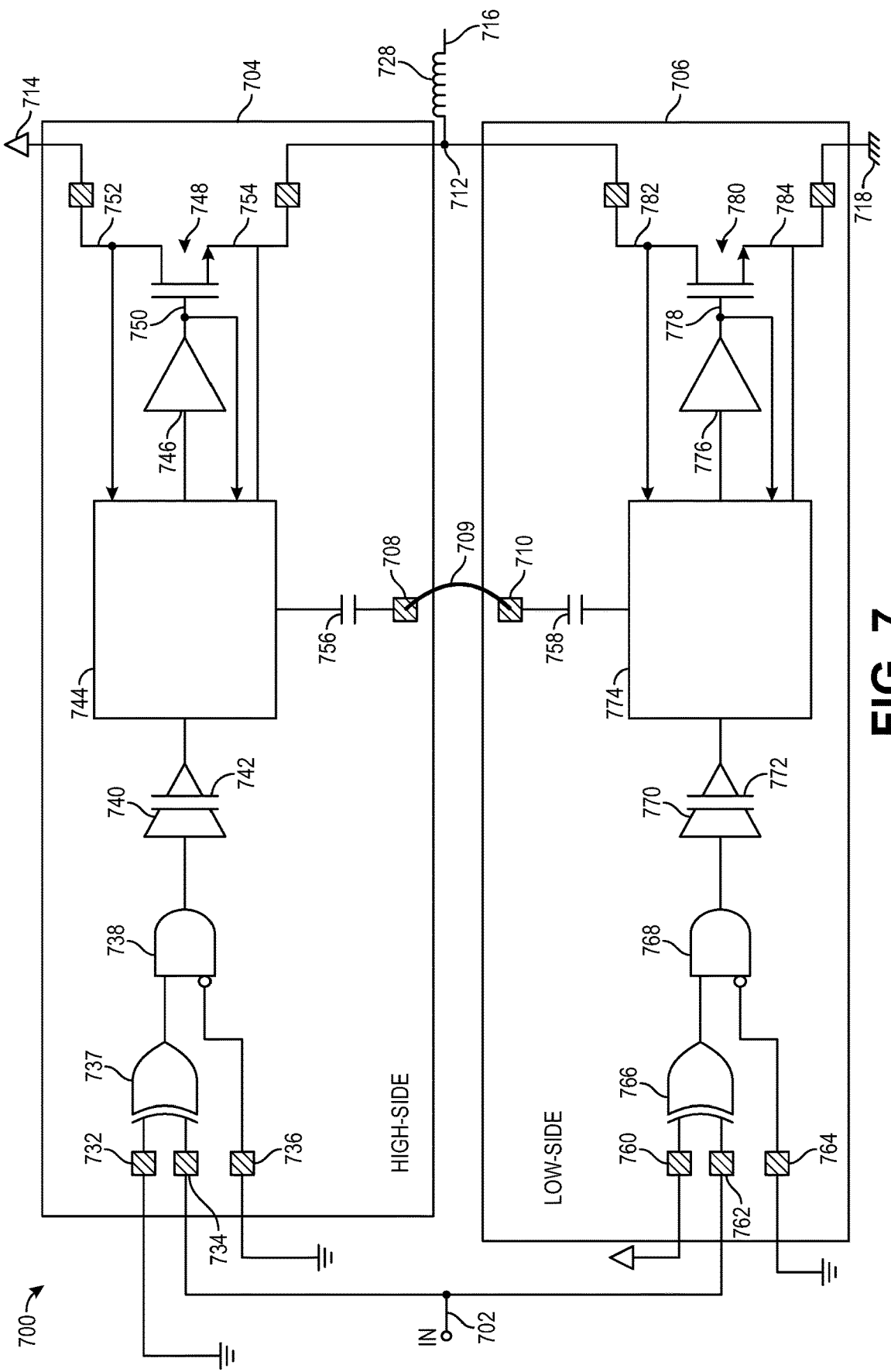
FIG. 7 illustrates a schematic of half-bridge circuit with automatic ZVS and automatic cross-conduction prevention of high-side and/or low-side switches, according to certain embodiments.

FIG. 7 illustrates a schematic of half-bridge circuit 700 with automatic ZVS and automatic cross-conduction prevention of high-side and/or low-side switches, according to certain embodiments. In the illustrated embodiment, a signal from a first side (e.g., low-side) can be transmitted to the second side (e.g., high-side) via capacitors 758 and 756 to provide relatively fast feedback to the second side to provide a status of the opposite-side power switch 748 or 780. In this way, the high-side may know the status (high or low) of the low-side switch (and vice-versa) without waiting for a long delay of a feedback signal traveling to the data input of the high-side switch.

The half-bridge circuit 700 can include a high-side die 704 and a low-side die 706. Each of the high-side die 704 and low-side die 706 have a similar data channel. The high-side die 704 can include a high-side power switch 748 having a gate terminal 750, a source terminal 754 and a drain terminal 752. The low-side die 706 can include a low-side power switch 780 having a gate terminal 778, a drain terminal 782 and a source terminal 784. The source terminal 754 and the drain terminal 782 can be coupled to a switching (SW) node 712. The SW node 712 may be coupled to an output inductor 728 that is coupled to an output terminal 716. The drain terminal 752 can be coupled to a power supply 714 and the source terminal 784 can be coupled to a power ground 718. In some embodiments, the circuits on the high-side die 704 and low-side die 706 may be integrated on a single monolithic die. In certain embodiments, circuits to the left of 742 (on high-side die 704) and circuits to the left of 772 (on low-side die 706) can be integrated on a first die, while the circuits to the right of 742 (on high-side die 704) and circuits to the right of 772 (on low-side die 706) can be integrated on a second die or as two separate dies. The power switches 748 and 780 can be integrated on a separate single die, or could be formed on separate dies. In various embodiments, the high-side power switch 748 and the low-side power switch 780 may be gallium nitride (GaN) based. In some embodiments, the high-side power switch 748 and the low-side power switch 780 may be silicon carbide (SiC) based.

The high-side die 704 can have an input terminal 732 that is arranged to receive a first logic control signal (POL), an input terminal 734 that is arranged to receive data (D), and an input terminal 736 arranged to receive a second logic control signal (Master). The first logic control signal POL can allow to invert data D due to the XOR gate 737. With one inverted polarity, a single IN terminal can be used for both high-side and low-side channels. Master signal is arranged to prevent short circuit in a half-bridge arrangement, when separate IN terminals are used for both high-side and low-side. In the illustrated embodiments, the input terminals 732 and 736 may be grounded. Similarly, the low-side die 706 can have an input terminal 760 arranged to receive a third logic control signal, an input terminal 762 arranged to receive data (D), and an input terminal 764 arranged to receive a fourth logic control signal. In the illustrated embodiment, the input terminal 760 may be coupled to a power supply keeping a voltage at the input terminal 760 high, and the input terminal 764 may be grounded. The input terminals 734 and 762 can be connected together and connected to an input terminal 702 that is arranged to receive input data IN.

The high-side die 704 can further include an Exclusive OR (XOR) gate 737 that is coupled to the input terminal 732 and 734. An output of the XOR gate 737 can be coupled to an AND gate 738. The AND gate 738 can also be arranged to receive an inverse of the second logic control signal. The output of the AND gate 738 be coupled to a driver 740 that has an isolation barrier 742. The output of the driver 740 can be coupled to an input of a logic circuit 744. The output of the logic circuit 744 can be coupled to gate driver 746. The gate driver 746 can be coupled to the gate terminal 750 and arranged to control a conductivity of the high-side power switch 748. A gate voltage at the gate terminal 750 can be fed back into the logic circuit 744. The local floating ground of the logic circuit 744 can be coupled to the SW node 712. The logic circuit 744 can be coupled to a capacitor 756 that is coupled to a terminal 710.

The low-side die can include a XOR gate 766 that is coupled to the input terminals 760 and 762. The output of the XOR gate 766 can be coupled to an AND gate 768. The AND gate 768 can also be arranged to receive an inverse of the third logic control signal at input terminal 764. The output of the AND gate 768 be coupled to a driver 770 that has an isolation barrier 772. The output of the driver 770 can be coupled to an input of a logic circuit 774. The output of the logic control circuit 774 can be coupled to gate driver 776. The gate driver 776 can be coupled to the gate terminal 778 and arranged to control a conductivity of the low-side power switch 780. A gate voltage at the gate terminal 778 can be fed back into the logic circuit 774. The logic circuit 774 can be coupled to a capacitor 758 that is coupled to terminal 710. The terminal 710 can be coupled to the terminal 708 by a bond wire or other suitable connection. The bond wire 709 may be a single bond wire or a plurality of bond wires. The local floating ground of the logic circuit 774 can be coupled to the power ground node 718.

The half-bridge circuit 700 is arranged such that a voltage at the SW node is a replica of the input signal IN with no cross-conduction between the high-side power switch 748 and the low-side power switch 780, and arranged to operate with automatic timing adjustment during ZVS operation. A high-frequency carrier signal can be transmitted between the terminal 710 and the terminal 708. The logic circuit 744 can set the terminal 708 to be in a high impedance state when the high-side switch power 748 is preparing to turn-on and as long as the high-side power switch 748 is on. In this way, terminal 708 may not send a carrier signal to the low-side die 706 to prevent cross-conduction between the high-side die 704 and low-side die 706. In some embodiments, terminal 708 can be coupled to a local oscillator that is part of the logic circuit 744. The logic circuit may include an envelope detector circuit that is arranged to detect a signal on the terminal 708. In various embodiments, when terminal 708 does not detect a HF carrier, the logic circuit 744 may blanked the pre-triggered signal such that the high-side power switch 748 remains in off state. This can occur when 780 is ON or when a large enough dv/dt current flows in the bonding wire 709 so that the corresponding logic circuit 744 input is clamped and no carrier from 774 can be detected. When 780 is OFF and no dv/dt occurs, 774 sends a carrier to 744 across 709 so that the 744 logic allows the turn-on of 752 if required by 732, 734, 736.

The logic circuit 744 can include a delay circuitry with a small internal delay time ($T_E$) to compensate for other relatively small internal digital delay times. In various embodiments, $T_E$ can be increased such that the half-bridge circuit 700 may operate with a minimum non-overlap dead time. In some embodiments, the dead time may be equal to a MAX(TE,ZVS)+DR where ZVS is the duration of the dV/dt when larger than a predefined slope and DR is the delay of the gate driver 746. In various embodiments, the dead time can be equal to $T_E$ delay. In the half-bridge circuit 700, the input terminals 734 and 762 can be connected to the input terminal 702 that is arranged to receive signal IN (Data). When a signal at the input terminal 760 (or 732) is high, a logic state of the data D may be inverted. Terminal 736 and/or 764 can be grounded when not used. If two logical controls are available from an external controller for the high-side and low-side, then input terminals 736 and 764 may connected. In this way, cross-conduction can be prevented if terminal 708 and/or 710 are not used.

In some embodiments, a data communication channel may include blanking features, capability to detect positive and negative dV/dt, and also include compensation of mismatches caused by parasitics present in semiconductor package assembly. In various embodiments, the data communication channel may include differential high voltage capacitors. Techniques disclosed herein can be advantageous in that they may not use any extra bond wires, thereby allowing space saving and use in compact implementations. In this way, digital isolators may be used in power applications without the employment of current consuming on-off keying (OOK) modulation. This can allow improvement in the efficiency of power applications at light load.

Figure 8:
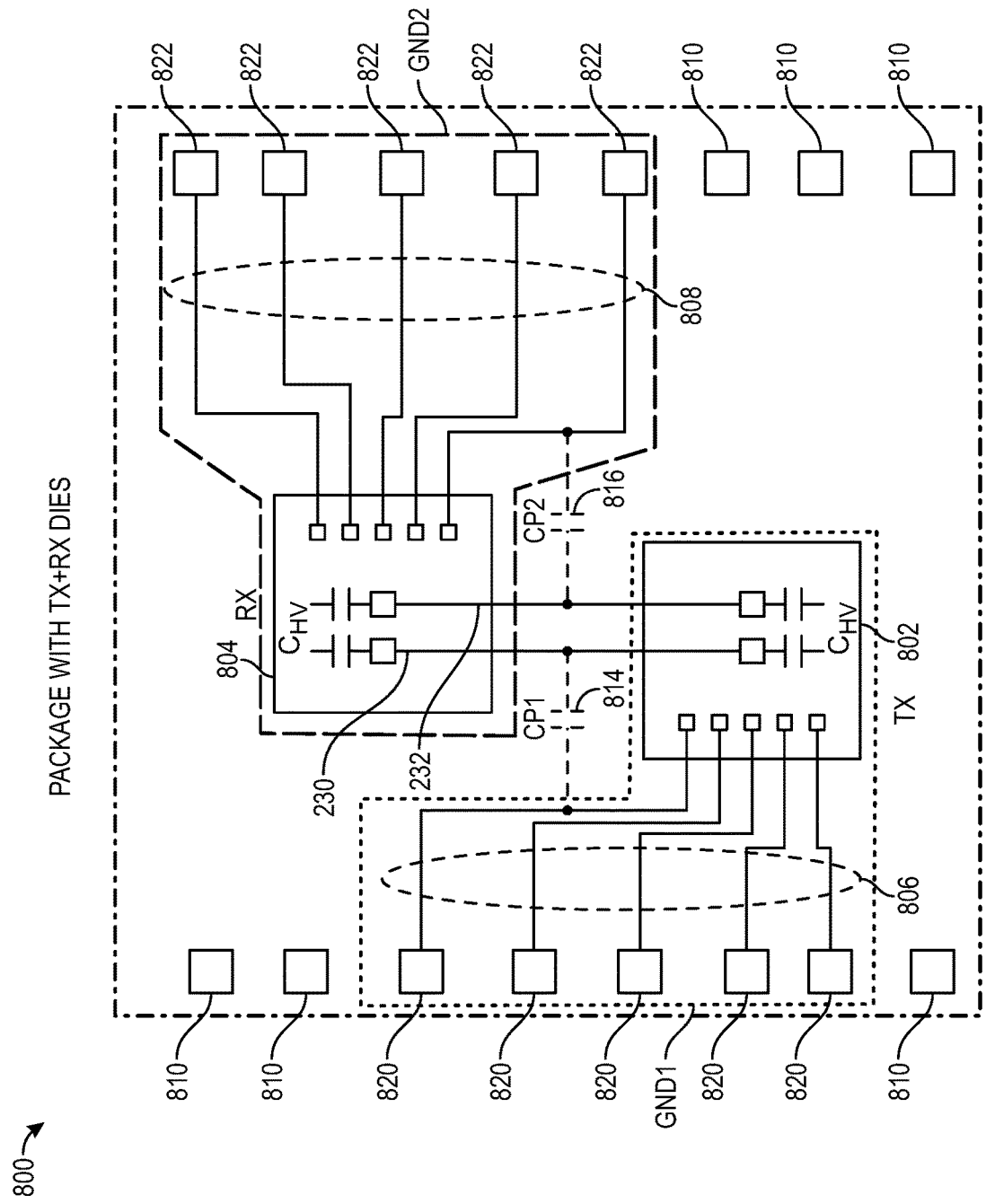
FIG. 8 illustrates a semiconductor package that includes a transmit die and a receive die, according to some embodiments.

FIG. 8 illustrates a semiconductor package that includes a transmit die and a receive die, according to some embodiments. In the illustrated embodiment, a semiconductor package 800 may include a transmit die 802 that is coupled to a receive die 804. In the illustrated embodiment, the transmitter is disposed on the transmit die and the receiver is disposed on the receive die, and the transmit and receive dies are disposed in a common semiconductor package 800. The semiconductor package may also be referred to as an electronic package. The semiconductor package 800 can include a plurality of pads 810. The transmit die 802 may be coupled to a first set of pads from the plurality of the pads by a plurality of bond wires 806. The first set from the plurality of the pads may be used as a first ground node 820. In some embodiments, all of the 820 pads may be various low voltage pads that operate relative to the local ground GND1. From large signal point of view (i.e., large dV/dt between GND1 and GND2), all pads connected to 820 can be equivalent to a single GND1. The receive die 804 may be coupled to a second set of pads from the plurality of the pads by bond wires 808. The second set of pads from the plurality of the pads may be considered, from a common mode point of view, as a second ground node 822. The first ground node 820 and the second ground node 822 may be isolated from each other. The transmit die 802 can operate with respect to the first ground node 820, while the receive die 804 can operate with respect to the second ground node 822. The transmit die 802 may be coupled to the receive die 804 by bond wire 230 and bond wire 232 (similar to FIG. 2).

A parasitic capacitance 814 may be present between the bond wire 230 and a first bond wire from the plurality of bond wires 806. Further, a parasitic capacitance 816 may be present between the bond wire 232 and a first bond wire from the plurality of bond wires 808. Thus, one of the bond wires of a differential path may experience more parasitic capacitance from one side compared to the other side. This may also be the case for the transmit die 802 and the receive die 804. First and second bond wires 230 and 232 can be coupling in series the two differential high voltage capacitors from the transmit die 802 and the receive die 804. As can be seen in FIG. 8, bond wire 230 may have a parasitic capacitance 814 to the first ground node 820, while bond wire 232 may have a parasitic capacitance 816 to the second ground node 822. Values of the parasitic capacitances 814 and 816 may be different. Embodiments of the disclosure enable mitigating the issues caused by parasitic capacitances 814 and 816, as discussed further below.

Techniques disclosed herein enable integration of systematic mismatch compensation capacitors within the high voltage capacitor structures. These systematic mismatch compensation capacitors 934 and 936 can partially compensate for the presence of systematic mismatch capacitances 814 and 816. In some embodiments, the systematic mismatch compensation capacitors 934 and 936 can completely compensate for the presence of systematic mismatch capacitances 814 and 816. In various embodiments, the disclosed systematic mismatch compensation capacitors can further compensate for other parasitic capacitances within the semiconductor package 800. In some embodiments, the semiconductor package 800 may be, for example but not limited to, QFN, while in other embodiments it can be, for example but not limited to, small outline package. As appreciated by one of ordinary skill in the art having the benefit of this disclosure, the semiconductor package may be any suitable semiconductor package. In some embodiments, 230 and 232 may each have a parasitic capacitor to GND1. But due to the relatively large size of GND1 area on the left side of 802, the parasitic capacitor from 230 to GND1 may be larger than from 232 to GND1. The difference between these 2 capacitors is CP1 (814). Embodiments of the disclosure can internally compensate CP1 with an extra internal mismatch capacitor. In various embodiments, a similar condition may be present for 804, resulting on a mismatch capacitor CP2 (816). The difference CP1-CP2 may not be relevant, because they are relative to different grounds. Embodiments of the disclosure can compensate them separately, for example, CP1 inside die 802 and/or CP2 inside die 804.

Figure 9:
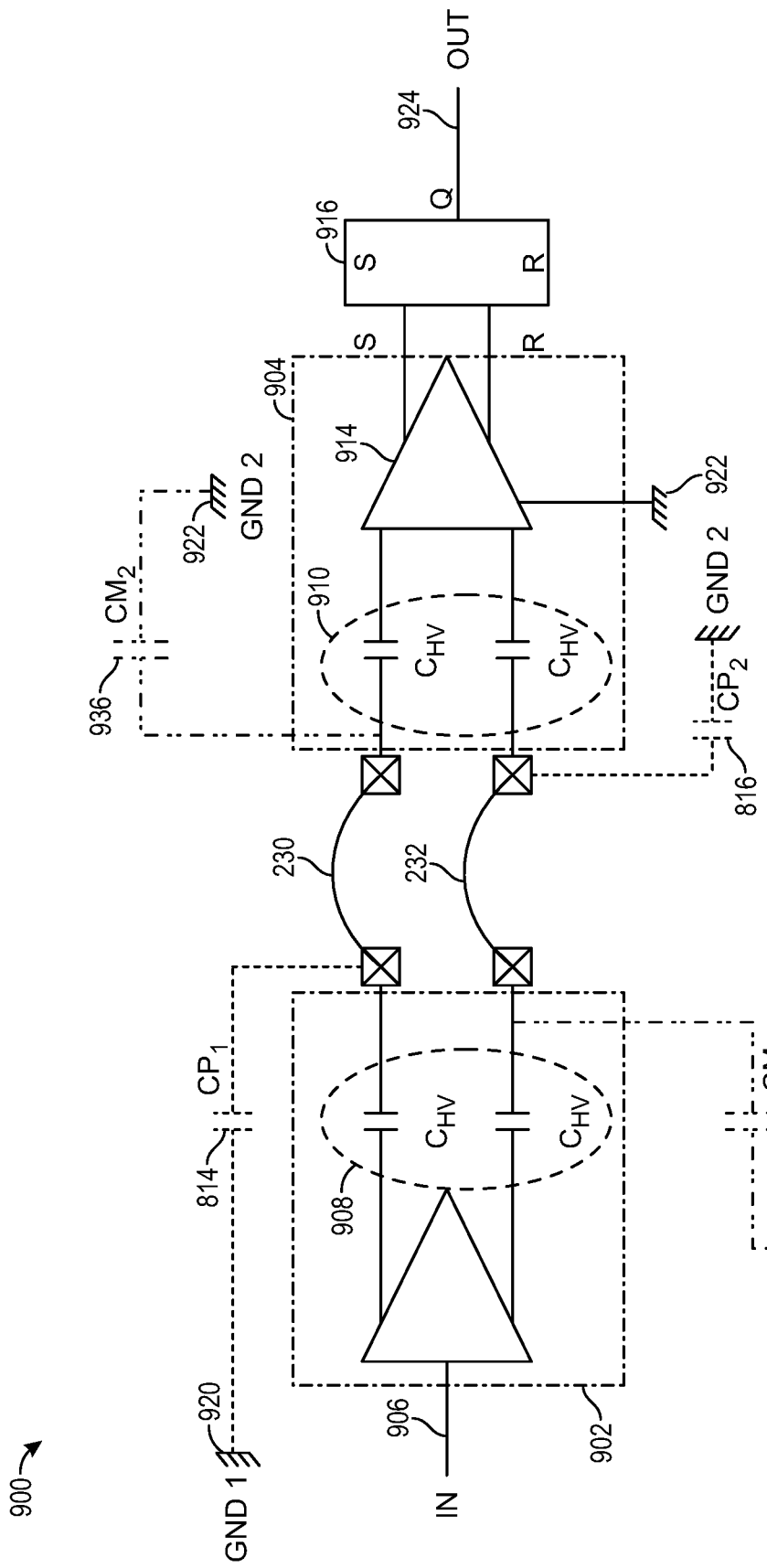
FIG. 9 illustrates a schematic of an equivalent circuit of a transmit die and a receive die with systematic mismatch compensation capacitors, according to some embodiments.

FIG. 9 illustrates a schematic of an equivalent circuit of a transmit die and a receive die with systematic mismatch compensation capacitors, according to some embodiments.

Circuit 900 shows an equivalent circuit of a transmitter and receiver with systematic mismatch compensation capacitors from a common-mode point of view. Circuit 900 can include a transmit portion 902 and a receive portion 904. The transmit portion 902 can receive input data D at an input terminal 906 and send the data D to a differential capacitor path 908. The input terminal 906 and the transmit portion 902 may operate with respect to a first ground node 920. The transmit portion 902 may be coupled to the receive portion 904 by bond wires 230 and 232. The bond wires 230 and 232 may be coupled to a pair of differential high voltage capacitors 910 of the receive portion 904. The pair of differential high voltage capacitors 910 can be coupled to a receiver 914. The receiver 914 can transform the modulated data into set and reset pulses. Theses pulses may be transmitted to an RS flipflop 916. The RS flipflop 916 can regenerate a copy the input data (with respect to first ground node 920) to an output terminal 924 (with respect to second ground node 922) to OUT. The output data OUT at output terminal 924 and the receive portion 904 can operate with respect to the second ground node 922.

Techniques disclosed herein enable integration of systematic mismatch compensation capacitors within high voltage capacitors. These systematic mismatch compensation capacitors can compensate for the presence of mismatch parasitic capacitances 814 and 816. As discussed above, parasitic capacitances 814 and 816 may be due to external package bond wire parasitics. In order to mitigate the effects of parasitic capacitances 814 and 816, a first compensation capacitor 934 and a second compensation capacitor 936 may be added to the transmit portion 902 and receive portion 904, respectively.

Figure 10:
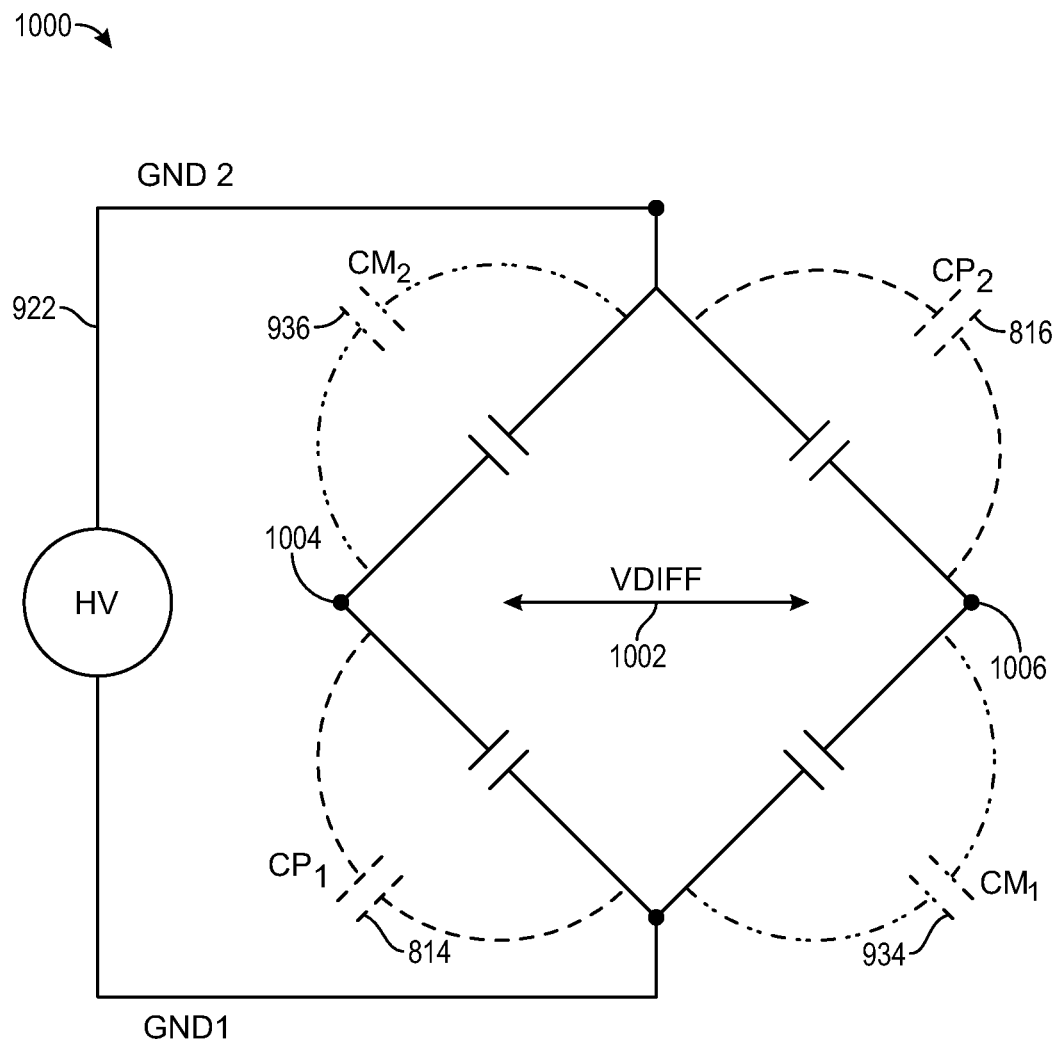
FIG. 10 illustrates a schematic of an equivalent circuit of the circuit 900, according to some embodiments.

FIG. 10 illustrates a schematic of an equivalent circuit of the circuit 900, according to some embodiments. As shown in FIG. 10, circuit 1000 may be a bridge circuit having a first ground node 920 and a second ground node 922. As a representation, the second ground node may be coupled to the first ground node by a common-mode high voltage supply HV. As shown in circuit 1000, if capacitance of the first and second compensation capacitor 936 is equal to capacitance of the parasitic capacitance 816, and if capacitance of the parasitic capacitance 814 is equal to capacitance of the first compensation capacitor 934 (i.e., CM2=CP2 and CP1=CM1), a value of a differential voltage 1002 between node 1004 and node 1006 can be zero volts, no matter what the value of the common-mode high voltage supply variation (dV/dt) HV may be. This way, any dV/dt common mode event cannot corrupt a differential data present on 1002.

In some embodiments, when the transmit die 802 and the receive die 804 are used with one type of semiconductor package, the values of the parasitic capacitances 814 and 816 may be estimated. Embodiments of the disclosure can enable setting values of the first and second compensation capacitors 934 and 936 equal to values of parasitic capacitances 814 and 816, respectively. In various embodiments, where a value of the parasitic capacitances 814 and 816 may not be known, embodiments of the disclosure can allow for a reduction of effects of the parasitic capacitances by the addition of the first and second compensation capacitors 934 and 936. For example, the value of the first and second compensation capacitors 934 and 936 can be set to 2 fF. This can partially compensate the mismatch introduced by the parasitic capacitances 814 and 816. In some embodiments, this may completely compensate the mismatch introduced by the parasitic capacitances 814 and 816. In this way, the same dies can be used in semiconductor packages where the value of the parasitic capacitance may be known as well as in semiconductor packages where the value of the parasitic capacitances may not be known. Techniques disclosed herein can enable similar performance from both of these types of packages. Further, embodiments of the disclosure can increase by a factor of, for example, 2 to 5, the rejection of the common mode. This can be useful when optimizing the circuit. In some embodiments, the factor of improvement for the common mode rejection can increase by a factor of 1.5 to 20. As appreciated by one of ordinary skill in the art having the benefit of this disclosure, the value of the compensation capacitors can be set to any suitable value.

Figure 11:
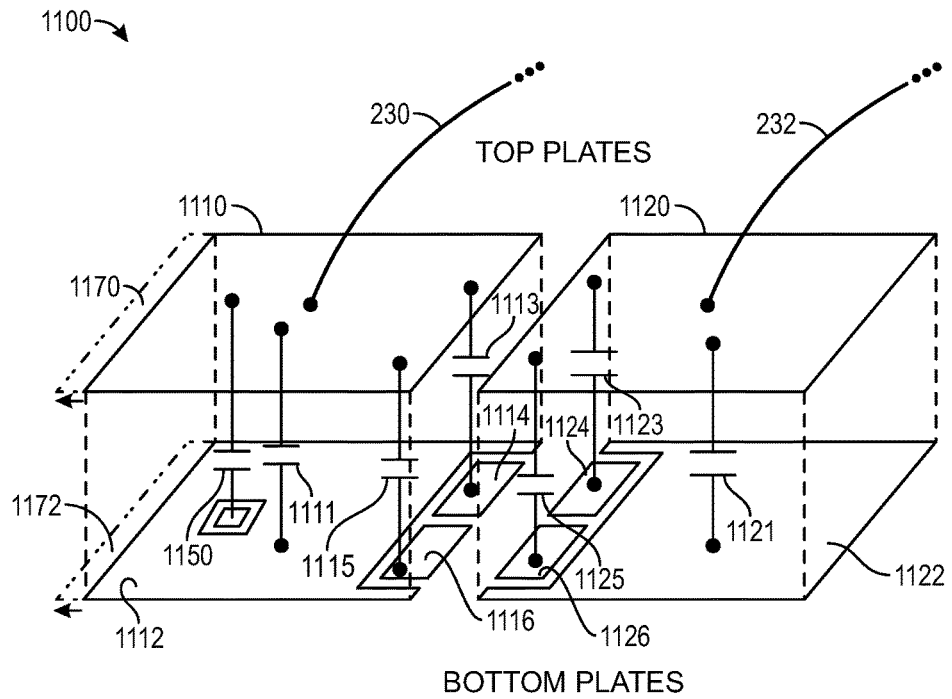
FIG. 11 shows an isometric view of a high voltage capacitor structure 1100 with compensation capacitors, according to some embodiments.

FIG. 11 shows an isometric view of a high voltage capacitor structure 1100 with compensation capacitors, according to some embodiments. The high voltage capacitor structure 1100 can include a first top plate 1110, and a first bottom plate 1112, a second bottom plate 1114 and a third bottom plate 1116. The first top plate 1110 can be coupled to a bond wire 230, and/or may utilize other interconnection methods. In some embodiments, bond wire 230 can be a single bond wire or a plurality of bond wires. The first bottom plate 1112 can be the largest of the three bottom plates and can be arranged to form a capacitor 1111 that may be used for data transmission. The second bottom plate 1114 and the third bottom plate 1116, can be relatively small and can be used to form capacitors 1113 and 1115, respectively. Capacitors 1113 and 1115 can be used for positive and negative dV/dt detection. A mismatch compensation capacitor 1150 can be added to this structure to compensate at first order for parasitic capacitances that might be present in a semiconductor package. In some embodiments, the mismatch compensation capacitor 1150 can compensate completely for the parasitic capacitances that might be present in a semiconductor package.

The high voltage capacitor structure 1100 further includes a second top plate 1120, and a fourth bottom plate 1122, a fifth bottom plate 1124 and a sixth bottom plate 1126. The second top plate 1120 can be coupled to a bond wire 232, and/or may utilize other interconnection methods. In some embodiments, bond wire 232 can be a single bond wire or a plurality of bond wires. The fourth bottom plate 1122 can be the largest of the three bottom plates and can be arranged to form a capacitor 1121 that may be used for data transmission. The fifth bottom plate 1124 and the sixth bottom plate 1126, can be relatively small and can be used to form capacitors 1123 and 1125, respectively. Capacitors 1123 and 1125 can be used for positive and negative dV/dt detection, respectively. In the illustrated embodiment, no mismatch compensation capacitor is added to the capacitor 1121.

As shown in FIG. 11, since the four small bottom plates may be prone to side effects. Embodiments of the disclosure can allow for symmetry and proximity between the two differential HV capacitors, the only side effect might occur on the external small side of these four capacitors. Some portions of the first bottom plate 1112 and the fourth bottom plate 1122 may be extended to surround the sides of the small rectangular bottom capacitors. In this way, side effects of electrical field affecting the value of the small capacitors can be minimized, thereby making dV/dt threshold detector circuit relatively more precise. In some embodiments, the first top plate 1110 and the first bottom plate 1112 may be extended such that extra areas 1170 and 1172 may be added to the area of the first top plate 1110 and the first bottom plate 1112, respectively. Then, the area of the capacitor 1150 may be removed. In this way, the area of 1172 may be set to be equivalent to the area of 1150. In this way, the capacitor values may be kept constant, the capacitors can be kept well matched, and 1150 can be precise without suffering of side effect as 1221 would.

Figure 12:
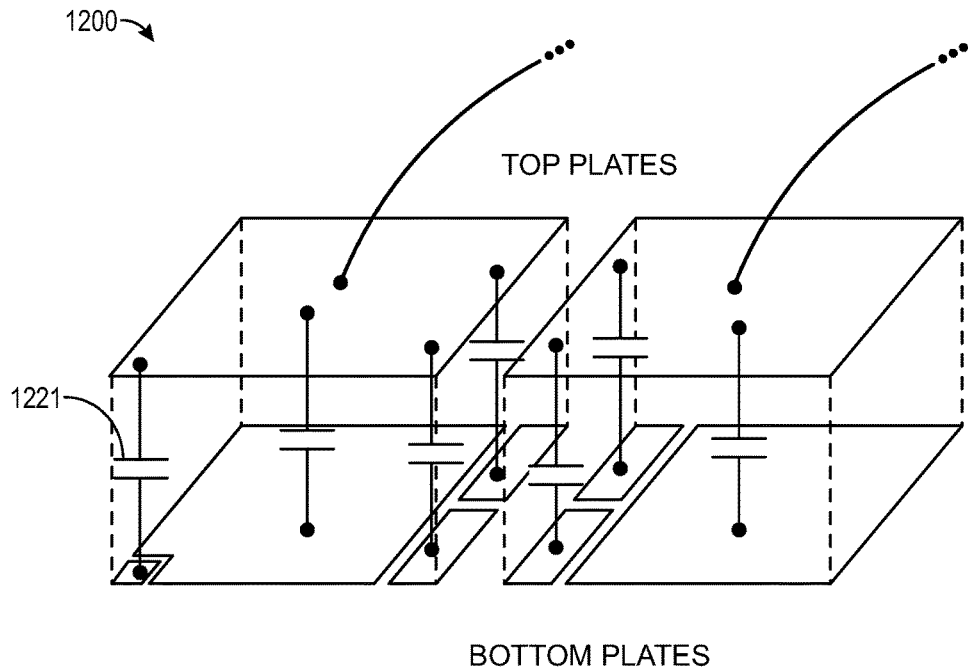
FIG. 12 shows an isometric view of a high voltage capacitor structure 1200 with compensation capacitors, according to alternate embodiments.

FIG. 12 shows an isometric view of a high voltage capacitor structure 1200 with compensation capacitors, according to alternate embodiments. The high voltage capacitor structure 1200 is similar to the high voltage capacitor structure 1100, except the location of the mismatch compensation capacitor 1221 has been moved to a side of the capacitor plate. As appreciated by one of ordinary skill in the art having the benefit of this disclosure, the location of the mismatch compensation capacitor can be placed set to any suitable location. As illustrated in FIG. 12, one can expect that 1221 will suffer from more side effect than 1150.

Although systems and methods for signal isolation in power converters are described and illustrated herein with respect to one particular configuration of a signal isolation in a power converter, embodiments of the disclosure are suitable for use with other configurations of signal isolation in power converters. For example, solid state lighting or traction inverters systems can employ embodiments of the disclosure for signal isolation.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom" or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

Various examples of the present disclosure are provided below. As used below, any reference to a series of examples is to be understood as a reference to each of those examples disjunctively (e.g., "Examples 1-4" is to be understood as "Examples 1, 2, 3, or 4").

Example 1 is a circuit comprising: a transmitter having an input terminal arranged to receive input data and a transmission node arranged to transmit intermediate data corresponding to the input data; and a receiver having a receive node arranged to receive the intermediate data and an output terminal arranged to produce output data corresponding to the input data, the receiver further including a dV/dt detector circuit coupled to the receive node and arranged to stop the production of the output data at the output terminal when the dV/dt detector circuit detects a rate of change of voltage with respect to time greater than a predetermined threshold.

Example 2 is circuit of example 1, wherein the dV/dt detector circuit is a first dV/dt detector circuit and wherein the predetermined threshold is a first predetermined threshold, wherein the transmitter further includes a second dV/dt detector circuit coupled to the transmission node and arranged to cause the transmitter to send a refresh signal to the receiver when the second dV/dt detector circuit detects a rate of change of voltage that is less than a second predetermined threshold.

Example 3 is the circuit of example(s) 1-2, wherein the first predetermined threshold is greater than the second predetermined threshold.

Example 4 is the circuit of example 1, wherein the transmitter is disposed on a first die and the receiver is disposed on a second die.

Example 5 is the circuit of example(s) 1 and 4, wherein the first and second dies are disposed in a common electronic package.

Example 6 is the circuit of example 1, further comprising a signal isolator coupled between the transmitter and the receiver.

Example 7 is the circuit of example(s) 1 and 6, wherein the signal isolator comprises plurality of cross-coupled capacitors.

Example 8 is the circuit of example(s) 1 and 6-7, wherein the plurality of cross-coupled capacitors comprises high voltage common centroidal layout capacitors.

Example 9 is the circuit of example(s) 1 and 6, wherein the signal isolator comprises a plurality of capacitors arranged in a non-cross-coupled configuration.

Example 10 is the circuit of example(s) 1, 6 and 9, wherein the signal isolator comprises one or more mismatch compensation capacitors.

Example 11 is the circuit of example(s) 1 and 6-8, wherein the plurality of cross-coupled capacitors are formed from conductive semiconductor layers.

Example 12 is the circuit of example(s) 1 and 6-8, wherein the receiver further comprises a low input impedance circuit that is coupled to the signal isolator.

Example 13 is a method of operating a circuit, the method comprising: providing a transmitter having an input terminal arranged to receive input data and a transmission node arranged to transmit intermediate data corresponding to the input data; providing a receiver having a receive node arranged to receive the intermediate data and an output terminal arranged to produce output data corresponding to the input data, the receiver further including a dV/dt detector circuit coupled to the receive node; receiving, by the transmitter, the input data; transmitting, by the transmitter, the intermediate data corresponding to the input data; receiving, by the receiver, the intermediate data; and producing, by the receiver, the output data corresponding to the input data at the output terminal.

Example 14 is the method of fabricating the circuit of example 13, further comprising detecting, by the dV/dt detector circuit, a rate of change of voltage with respect to time of a voltage at the receive node; and stopping the production of the output data at the output terminal when the dV/dt detector circuit detects a rate of change of voltage with respect to time greater than a predetermined threshold.

Example 15 is the method of fabricating the circuit of example(s) 13 and 14, wherein the dV/dt detector circuit is a first dV/dt detector circuit and wherein the predetermined threshold is a first predetermined threshold, and wherein the transmitter further includes a second dV/dt detector circuit coupled to the transmission node.

Example 16 is the method of fabricating the circuit of example(s) 13-15, further comprising causing, by the second dV/dt detector circuit, the transmitter to send a refresh signal to the receiver when the second dV/dt detector circuit detects a rate of change of voltage at the transmission node that is less than a second predetermined threshold.

Example 17 is the method of fabricating the circuit of example 13, wherein the circuit further comprises a signal isolator coupled between the transmitter and the receiver.

Example 18 is the method of fabricating the circuit of example(s) 13 and 17, wherein the signal isolator comprises a plurality of cross-coupled capacitors arranged in a common centroidal layout configuration.

Example 19 is the method of fabricating the circuit of example(s) 13 and 17, wherein the signal isolator comprises one or more mismatch compensation capacitors.

Example 20 is the method of fabricating the circuit of example 13, wherein the transmitter is disposed on a first die and the receiver is disposed on a second die, the first and second dies being disposed in a common electronic package.

One of ordinary skill in the art will appreciate that other modifications to the apparatuses and methods of the present disclosure may be made for implementing various applications of the methods and systems for enhanced area getter architecture for a wafer-level vacuum packaged uncooled focal plane array without departing from the scope of the present disclosure.

The examples and embodiments described herein are for illustrative purposes only. Various modifications or changes in light thereof will be apparent to persons skilled in the art. These are to be included within the spirit and purview of this application, and the scope of the appended claims which follow.

What is claimed is:

1. A circuit comprising:
    a transmitter having an input terminal arranged to receive input data and a transmission node arranged to transmit intermediate data corresponding to the input data; and
    a receiver having a receive node arranged to receive the intermediate data and an output terminal arranged to produce output data corresponding to the input data, the receiver further including a dV/dt detector circuit coupled to the receive node and arranged to stop the production of the output data at the output terminal when the dV/dt detector circuit detects a rate of change of voltage with respect to time greater than a predetermined threshold.

2. The circuit of claim 1, wherein the dV/dt detector circuit is a first dV/dt detector circuit and wherein the predetermined threshold is a first predetermined threshold, wherein the transmitter further includes a second dV/dt detector circuit coupled to the transmission node and arranged to cause the transmitter to send a refresh signal to the receiver when the second dV/dt detector circuit detects a rate of change of voltage that is less than a second predetermined threshold.

3. The circuit of claim 2, wherein the first predetermined threshold is greater than the second predetermined threshold.

4. The circuit of claim 1, wherein the transmitter is disposed on a first die and the receiver is disposed on a second die.

5. The circuit of claim 4, wherein the first and second dies are disposed in a common electronic package.

6. The circuit of claim 1, further comprising a signal isolator coupled between the transmitter and the receiver.

7. The circuit of claim 6, wherein the signal isolator comprises plurality of cross-coupled capacitors.

8. The circuit of claim 7, wherein the plurality of cross-coupled capacitors comprises high voltage common centroidal layout capacitors.

9. The circuit of claim 8, wherein the plurality of cross-coupled capacitors are formed from conductive semiconductor layers.

10. The circuit of claim 8, wherein the receiver further comprises a low input impedance circuit that is coupled to the signal isolator.

11. The circuit of claim 6, wherein the signal isolator comprises a plurality of capacitors arranged in a non-cross-coupled configuration.

12. The circuit of claim 11, wherein the signal isolator comprises one or more mismatch compensation capacitors.

13. A method of operating a circuit, the method comprising:
    providing a transmitter having an input terminal arranged to receive input data and a transmission node arranged to transmit intermediate data corresponding to the input data;
    providing a receiver having a receive node arranged to receive the intermediate data and an output terminal arranged to produce output data corresponding to the input data, the receiver further including a dV/dt detector circuit coupled to the receive node;
    receiving, by the transmitter, the input data;

transmitting, by the transmitter, the intermediate data corresponding to the input data;

receiving, by the receiver, the intermediate data; and producing, by the receiver, the output data corresponding to the input data at the output terminal.

14. The method of claim 13, further comprising:

detecting, by the dV/dt detector circuit, a rate of change of voltage with respect to time of a voltage at the receive node; and stopping the production of the output data at the output terminal when the dV/dt detector circuit detects a rate of change of voltage with respect to time greater than a predetermined threshold.

15. The method of claim 14, wherein the dV/dt detector circuit is a first dV/dt detector circuit and wherein the predetermined threshold is a first predetermined threshold, and wherein the transmitter further includes a second dV/dt detector circuit coupled to the transmission node.

16. The method of claim 15, further comprising causing, by the second dV/dt detector circuit, the transmitter to send a refresh signal to the receiver when the second dV/dt detector circuit detects a rate of change of voltage at the transmission node that is less than a second predetermined threshold.

17. The method of claim 13, wherein the circuit further comprises a signal isolator coupled between the transmitter and the receiver.

18. The method of claim 17, wherein the signal isolator comprises a plurality of cross-coupled capacitors arranged in a common centroidal layout configuration.

19. The method of claim 17, wherein the signal isolator comprises one or more mismatch compensation capacitors.

20. The method of claim 13, wherein the transmitter is disposed on a first die and the receiver is disposed on a second die, the first and second dies being disposed in a common electronic package.

* * * * *